United States Patent
Rennard et al.

(10) Patent No.: US 6,405,123 B1
(45) Date of Patent: Jun. 11, 2002

(54) METHOD AND SYSTEM FOR AN EFFICIENT OPERATING ENVIRONMENT IN A REAL-TIME NAVIGATION SYSTEM

(75) Inventors: Robert Rennard, San Martin; Sean Quan Du; Sami Fawzi Nasser, both of San Jose; Yi-Chung Chao, Milpitas; Ruslan Adikovich Meshenberg, Santa Clara; Haiping Jin, San Jose; Chung Benjamin Yip, Los Altos, all of CA (US)

(73) Assignee: TeleVigation, Inc., Santa Clara, CA (US)

( * ) Notice: Subject to any disclaimer, the term of this patent is extended or adjusted under 35 U.S.C. 154(b) by 0 days.

(21) Appl. No.: 09/574,555

(22) Filed: May 17, 2000

Related U.S. Application Data

(60) Provisional application No. 60/183,075, filed on Feb. 16, 2001, and provisional application No. 60/171,683, filed on Dec. 21, 1999.

(51) Int. Cl.[7] .............................................. G01C 21/00
(52) U.S. Cl. ........................ 701/200; 701/201; 701/211; 340/988; 342/357.08; 342/357.1; 342/357.13
(58) Field of Search .................................. 701/200, 208, 701/201, 211, 213, 24, 28; 370/988–995; 342/357.01, 357.06, 357.08, 357.1, 357.13

(56) References Cited

U.S. PATENT DOCUMENTS

| | | | |
|---|---|---|---|
| 5,528,248 A | 6/1996 | Steiner et al. ............... 342/357 |
| 5,610,821 A | 3/1997 | Gazis et al. ............. 364/444.2 |
| 5,742,509 A | 4/1998 | Goldberg et al. ......... 364/449.5 |
| 5,884,218 A * | 3/1999 | Nimura et al. ............... 701/208 |
| 5,902,350 A | 5/1999 | Tamai et al. ................ 701/211 |
| 5,904,728 A | 5/1999 | Tamai et al. ................ 701/211 |
| 5,910,177 A | 6/1999 | Zuber .......................... 701/202 |
| 5,912,635 A | 6/1999 | Oshizawa ................... 340/988 |
| 5,922,042 A | 7/1999 | Sekine et al. ................ 701/210 |
| 5,928,307 A | 7/1999 | Oshizawa .................... 701/210 |
| 5,933,100 A | 8/1999 | Golding ....................... 340/995 |
| 5,938,720 A | 8/1999 | Tamai .......................... 701/209 |
| 5,938,721 A | 8/1999 | Dussell ........................ 701/211 |
| 5,987,381 A | 11/1999 | Oshizawa .................... 701/209 |
| 6,014,090 A | 1/2000 | Rosen et al. ................ 340/905 |
| 6,021,371 A | 2/2000 | Fultz ........................... 701/200 |
| 6,029,069 A | 2/2000 | Takaki ......................... 455/456 |
| 6,055,478 A * | 4/2000 | Heron ......................... 701/213 |
| 6,070,123 A | 5/2000 | Beyer et al. ................ 701/209 |
| 6,107,944 A | 8/2000 | Behr et al. .................. 340/995 |
| 6,199,045 B1 * | 3/2001 | Giniger et al. ................ 705/5 |
| 6,266,615 B1 | 7/2001 | Jin ............................. 701/213 |

OTHER PUBLICATIONS

International Search Report, dated Mar. 26, 2001, for International Application No. PCT/US00/35075, filed Dec. 21, 1000.

International Search Report, dated Jan. 4, 2001, for International Application No. PCT/US00/27083, filed Sep. 27, 2000.

International Search Report, dated Jan. 12, 2001, for International Application No. PCT/US00/26921, filed Sep. 27, 2000.

* cited by examiner

*Primary Examiner*—Yonel Beaulieu
(74) *Attorney, Agent, or Firm*—Pennie & Edmonds LLP

(57) ABSTRACT

A method and system for interactive real-time distributed navigation employs improved techniques for input and output. The method and system may receive inputs through a wireless device. The operating environment simplifies and reduces these inputs. In some embodiments, the system receives non-deterministic input to generate deterministic information using a number of methods. The system may also employ improved output techniques including methods for pacing navigational prompts provided by a navigation system, and methods of providing navigational information to a number of users. The method and system are applicable to text, graphics or audible navigation systems.

33 Claims, 18 Drawing Sheets

INTERACTIVE REAL TIME DISTRIBUTED NAVIGATION SYSTEM–ARCHITECTURE A

INTERACTIVE REAL TIME DISTRIBUTED NAVIGATION SYSTEM—ARCHITECTURE A

INTERACTIVE REAL TIME DISTRIBUTED NAVIGATION SYSTEM—ARCHITECTURE B

METHOD AND SYSTEM FOR AN EFFICIENT OPERATING ENVIRONMENT IN A REAL-TIME NAVIGATION SYSTEM

This application claims priority under 35 U.S.C. §119 to Provisional Patent Application Ser. No. 60/183,075, filed on Feb. 16, 2001 and No. 60/171,683, filed on Dec. 21, 1999.

I. FIELD OF THE INVENTION

This invention relates to navigation systems and location-based information delivery. Specifically, this invention relates to a method and system for an efficient operating environment for interactive and real-time navigation.

II. BACKGROUND OF THE INVENTION

Many commercial navigation systems are based on satellite-based global positioning system (GPS) devices, which have been applied in automobile navigation, see, e.g., U.S. Pat. Nos. 5,938,720; 5,928,307; 5,922,042; 5,912,635; 5,910,177; 5,904,728; 5,902,350, all incorporated herein by reference for all purposes. Such automobile navigation systems, however, are expensive and inconvenient to use. Further, many such systems are not appropriate for navigation while the user is walking. Therefore, there is a need in the art to incorporate navigation systems in personal handheld devices.

There are several technical obstacles that stand in the way of the incorporation of navigational capabilities in handheld devices for providing turn-by-turn real-time navigation services. One such obstacle is the amount of geographic data needed to provide reasonably detailed navigational information. Small handheld devices include cellular phones, personal digital assistants, or computers. The amount of embedded memory in such devices is limited and thus it is impractical for storage of large amounts of geographic information. In existing automobile navigation systems, GPS devices are employed to provide information about the location and movement of a user. Geographic information is usually stored in a geographic mapping database stored on a CD-ROM, hard-disk drive device or other large capacity storage medium.

Another obstacle is that the lack of information processing power in small devices, such as those mentioned above. For example, the information processing power of a cellular telephone is typically provided by an embedded microprocessor with limited memory. While the information processing power of embedded microprocessors is generally increasing, such processors are still not suitable for processor intensive real-time navigational tasks.

An additional obstacle is the insufficient location accuracy provided by current technology. Initial sources of inaccuracy of the GPS based systems, for example, may be imposed by the U.S. Department of Defense through Selective Availability (S/A), other sources of error are due to atmospheric and timing errors limiting the accuracy of a single GPS receiver to ±50 meters. Methods exist that can be used to enhance the location accuracy to about ±5 meters. Such methods include Enhanced GPS systems (i.e., SnapTrack) and network based system (i.e., Truepoint). These methods use a known position, such as a survey control point, as a reference point to correct the GPS position error. These methods of correcting GPS positions are referred to as Differential GPS or DGPS. The DGPS corrections can be applied to the GPS data in real-time using data telemetry (radio modems). Toward expanding the use of DGPS, the United States and Canadian Coast Guard are establishing a series of radio beacons to transmit the DGPS corrections for accurate navigation along the Great Lakes, the Mississippi River and tributaries, the Gulf Coast, and the Eastern and Western coasts of North America. However, such radio beacons are not available to consumers traveling in most inland locations.

Navigational systems are difficult to develop further because the desired accuracy depends on the particular application. For example, if the user is driving in a downtown area with closely spaced streets, a GPS location with accuracy within ±50 meters is not adequate to give turn-by-turn directions. In this context GPS location information is thus considered ambiguous and inappropriate for practical navigation. In other situations, providing a GPS location within ±50 meters is, however, perfectly adequate for navigation purposes. For example, if a user is driving on a highway in a remote area without any nearby exits, the GPS location is sufficient for calculating further navigation directions. Thus, in such a situation, the GPS location is not ambiguous.

Current automobile GPS navigation systems make use of other sensors, such as accelerometers, speedometers, etc. plus some sophisticated filtering technology to improve the accuracy of a navigational system (see, e.g., U.S. Pat. No. 5,912,635, previously incorporated by reference for all purposes). In addition, many automobile-based navigational systems use map-aiding technology as well. However, for a navigational system implemented using handheld devices, such as cellular telephones, it is impractical to have the handheld devices connected to external sensors, especially when the device is used while walking.

Applicants point out and incorporate by reference for all purposes related applications, one entitled "Method and System for an Interactive and Real-Time Distributed Navigation System" (U.S. application Ser. No. 09/525,604) filed on Mar. 14, 2000 and another entitled "Method and System for an Interactive and Real-Time Distributed Navigation System" (U.S. application Ser. No. 09/547,421, now U.S. Pat. No. 6,226,615 B1) filed on Apr. 11, 2000.

Accordingly, it would be desirable to provide a navigational system and service that deliver accurate navigational instructions. It would further be desirable to provide a navigational system that can be implemented using existing infrastructure and that is adaptable to new infrastructures as they become available.

It would further be desirable to provide a navigational system and service that can be implemented using handheld devices with limited computational power, as well as devices with enhanced computational power.

It would further be desirable to provide a navigational system and service that can make use of many forms of real-time information to provide accurate location calculations as well as optimal navigation paths.

It would further be desirable to provide an efficient environment to users in utilizing a pool of information including map, geographical, personal and location data.

Reference will now be made in detail to the preferred embodiments of the invention, examples of which are illustrated in the accompanying drawings.

As will be appreciated by one of skill in the art, the present invention may be embodied as a method, data processing system or program products. Accordingly, the present invention may take the form of navigation systems, navigation methods, navigation devices, navigation software, etc. Software written according to the present invention is to be stored in a form of computer-readable medium, such as random access memory, hard disk memory or CD ROM, to be transmitted over a network, and executed by a processor.

III. SUMMARY OF THE INVENTION

These and other objects are provided for by a system and method for interactive real-time distributed navigation. In an embodiment of the invention, an operating environment is provided that receives a text message containing location information on a wireless device and identifies such location information for input to the navigation system. In another embodiment of the invention, location information is delimited by predetermined characters in the text message.

In another embodiment of the invention, an enhanced operating environment is provided by allowing a user of a navigational system to pre-plan locations and routes using information provided by the navigational system. Such preplanned information is stored by the navigational system for later retrieval by the user. In another embodiment, information is gathered for a user of a navigational system including recently traveled routes which can be retrieved by the user for improved entry of information to the navigation system.

In another embodiment, an enhanced operating environment is provided by allowing user of a navigational system to label locations. Such labeling is done in a pre-planned manner. Furthermore, such labeling is done to record a user's present location.

In another embodiment, an enhanced operating environment is provided by providing navigational prompts to a user in a paced manner responsive to the user's input to the navigational system. In another embodiment, the navigational prompts are stored to an alternative repository.

In another embodiment, the invention provides navigation prompts based on real-time traffic conditions. The traffic information can be obtained from a group of navigational service users, by observing their speeds and making comparisons with the nominal street speed limits in a map database. This traffic information assists the system to determine an optimal route for its users in real-time. At each juncture, the system dynamically determines an optimal path to get to the destination based on the traffic information. The best route can be defined based on the user's request, for example, it can be either time or gas consumption which will be minimized.

In another embodiment, an enhanced operating environment is provided by improving a method by which a user logs into a navigational system, wherein a user password or personal identification number is associated with such user's wireless device. In an embodiment, the wireless device transmits a wireless subscriber identification which the system associates with a user's valid account to the navigational system.

In another embodiment, an enhanced operating environment is provided by allowing a user to input non-deterministic information. Upon processing, deterministic input is provided to the navigational system. In an embodiment, non-deterministic information is entered through a keypad, wherein the keys on the keypad are associated with more than one character. In another embodiment, non-deterministic information is entered through a keypad in an iterative manner such that the system presents deterministic information consistent with key entries as entered for subsequent entry to the navigation system.

In another embodiment, an enhanced operating environment is provided by allowing entry of information through a voice response system. In an embodiment, the performance of the voice response system is improved by limiting the voice grammars used by the system. In an embodiment, street grammars are limited by characteristics of such streets. In another embodiment, street grammars are limited by a distance from a user's home or by a distance from a user's present invention. In another embodiment, the performance of the voice response system is improved by providing a spelling of part of the voice response input.

IV. BRIEF DESCRIPTION OF THE DRAWINGS

The accompanying drawings illustrate various embodiments of the invention and, together with the description, serve to explain the principles on which it is based. In these drawings.

V. DETAILED DESCRIPTION OF THE EMBODIMENTS

Figure 1:
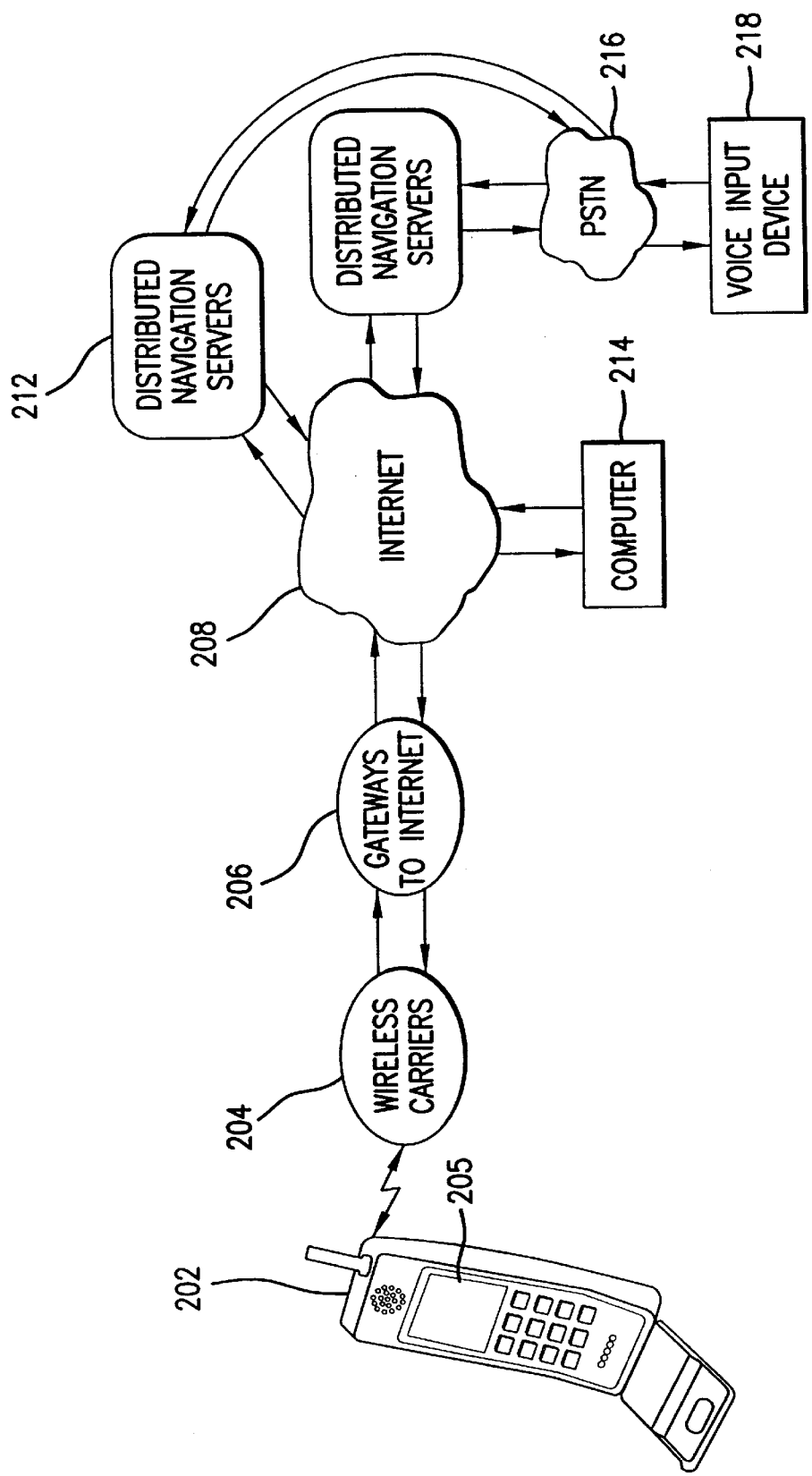
FIG. 1 is a block diagram of a system architecture for an interactive real-time distributed navigation system in one embodiment of the invention.

FIG. 1 shows an architecture for an interactive real-time distributed navigation system in accordance with a preferred embodiment. The various components and their interaction will now be described. It is to be understood that where like numerals are used in different figures, such like numerals refer to the same item. Wireless device 202 may take the form of a cellular telephone, satellite telephone, wireless Personal Digital Assistant (PDA), personal computer or other suitable device having wireless communications capability. Preferably, wireless device 202 is equipped with positioning capability that takes the form of, for example, global positioning systems (GPS), emergency 911 (E911) location, or others, including those that may become available in the future. Currently, various manufacturers produce wireless telephones, which are enabled with the Wireless Application Protocol to present information to the user. Manufacturers include AT&T, SPRINT PCS, GTE WIRELESS. In a specific embodiment, such telephones are appropriate for use as wireless device 202. Furthermore, PHONE.COM makes a product called SDK, appropriate for testing and modeling. This type of products are also intended for use with this invention. One skilled in the art will appreciate that the present invention is not limited to any particular positioning technology. In one embodiment, wireless device 202 is manufactured with built-in positioning capabilities. Presently available providers of positioning information include ERICSSON, QUALCOMM, MOTOROLA, LUCENT, and US WIRELESS.

In a specific embodiment, wireless device 202 not need to carry map information, or may carry only a predetermined amount of map information, depending on the wireless device's 202 storage capability. Such a system is described as a distributed system and will be further discussed below.

In one embodiment, the capabilities of wireless device 202 are enhanced through interfacing with modular attachments. An essential function of wireless device 202 is to provide an interface between the navigational system of this invention and a user. In particular, wireless device 202 provides a user interface 205 for displaying graphical, textual or audible information. User interface 205 allows the user to make use of various sensory capabilities. In an exemplary scenario, a user perceives geographical markers or other stimuli and then processes such information within his mind. The user is then able to utilize this type of processed information using the system and method of the invention by providing appropriate inputs through user interface 205. User interface 205 can further provide instructions for completing a task where, for example, electromechanical components are involved. For example, where the navigation system of the present invention is incorporated within an automobile, an improved operation may necessitate moving the automobile to a certain position or direction. Through user interface 205, the user can receive specific instructions on how to move and position the automobile. Such interaction is used to improve the positioning accuracy of system of the invention, where interaction is achieved through text, graphics or audible signals. Various modifications using different human sensors will be apparent and are deemed within the scope of the invention.

Because wireless device 202 is capable of relaying information to a user by means of audible signals or through displayed text, embodiments of this invention make use of audible sound producing devices, as well as text displaying devices. Where a text displaying device is used, enhanced performance is achieved using a wireless device 202 capable of displaying several lines of text. An enhanced video display is also contemplated for wireless device 202 for use in displaying maps and enhanced directional information. In another embodiment, wireless device 202 has incorporated within it gyroscopic or geomagnetical enhancements. Such enhancements can be used to provide real-time position and orientation information. One of skill in the art understands that many more enhancements are possible for wireless device 202 without deviating from the teachings of the invention.

As further shown in FIG. 1, wireless carrier 204 provides wireless connectivity between wireless device 202 and distributed navigation servers 212 to be described below. In an embodiment of the invention, WINDOWS NT servers are used as the operating platform. Examples of wireless carrier 204 include cellular telephone carriers, satellite communications carriers or global positioning system carriers. In achieving wireless connectivity, wireless carriers provide an existing infrastructure for the wireless devices and distributed navigation servers. In an embodiment, GPS is used along with the government imposed selective availability. One with skill in the art will understand that where such limitation is removed, the present invention can further be enhanced. Because of the adaptive interaction with the user, information ranging from general to very specific is relayed to the user for a wide range of navigational applications.

While keeping within the teachings of the invention, wireless carrier 204 provides positioning information such as through GPS, E911 or other positioning systems. In addition, positioning information may be obtained through a third party and is then used by wireless carrier 204. For example, wireless service resellers, wireless internet service provides (ISPs), or satellite wireless carriers, among others, provide services which can be implemented in embodiments of the invention. Importantly, wireless throughput and bandwidth continues to increase through the advent of digital transmission and through other techniques. Analog (i.e., AMPS) systems provide for a certain level of service. However, more advanced digital transmission techniques, such as, but not limited to GSM, TDMA, CDMA, provide higher data throughput. At the time of the invention, CDMA is believed to provide the highest throughput of information, however, it is expected that wireless technology will further be developed. Because of its broad application, the present invention is appropriate for these and many other transmission techniques. In an embodiment of the invention, wireless carrier 204 receives analog or digital information from the wireless device 202 and directs such information to other components of the system of this invention, such as server 212. Similarly, wireless carrier 204 receives information from components of the invention such as server 212 and then directs such information to wireless device 204.

As shown in FIG. 1, wireless carrier 204 is connected to gateway 206 which provides an interface to network 208. In general, gateway 206 is a network point that acts as an entrance to another network and is provided by, among others, wireless carriers, ISPs, or other telecommunications providers. In an embodiment of the invention, network 208 is the Internet. The Internet provides advantages because it is a widely distributed network reaching many areas of the world. In another embodiment, network 208 is implemented as a proprietary communications network. For example, by utilizing specialized communications network connections, network 208 may be customized to provide minimal latency and optimal performance.

As illustrated in FIG. 1, in accordance with a preferred embodiment, one or more distributed navigation servers 212 form part of the system of the invention and communicate with its other components using communications network 208. In a preferred embodiment distributed navigation servers 212 store street map information and point of interest information and further perform processing tasks. In this manner, wireless device 202 is not burdened with carrying all the necessary information for proper navigation. In an embodiment, distributed navigation servers 212 also process location-specific information, such as real-time traffic information. In an embodiment, traffic information is obtained from a group of navigation service users. By observing and comparing their positions, speeds and times, and making further comparisons with nominal street speed limits in a map database, real-time traffic information is generated and then used by the invention. Suitable map databases may be provided by TELCONTAR with its "DRILL DOWN SERVER", QUALITY MARKETING SOFTWARE with its "GEOSTAN LIBRARY", and NAVTECH with its digital map products. Furthermore, suitable traffic information providers include ETAK, TRAFFICSTATION.COM and METROWORKS. In a preferred embodiment, at each juncture towards a destination, the system dynamically determines the optimal route for a particular user responsive to ever changing conditions. For example, where due to changed conditions a first route becomes less optimal, a second route is generated and presented to a user. An optimal route is determined in several ways depending on a user's preference. For example, an optimal route can be based on minimum time, minimum distance or minimum consumption of fuel. Processor intensive functions, such as navigation guide algorithms, are processed by distributed navigation servers 212 so as to reduce the computational burden on wireless device 202. As part of the processing function of distributed navigation servers 212, in an embodiment, these servers provide conversion functions such as between HDML or WML to HTML and vice versa.

Figure 2A:
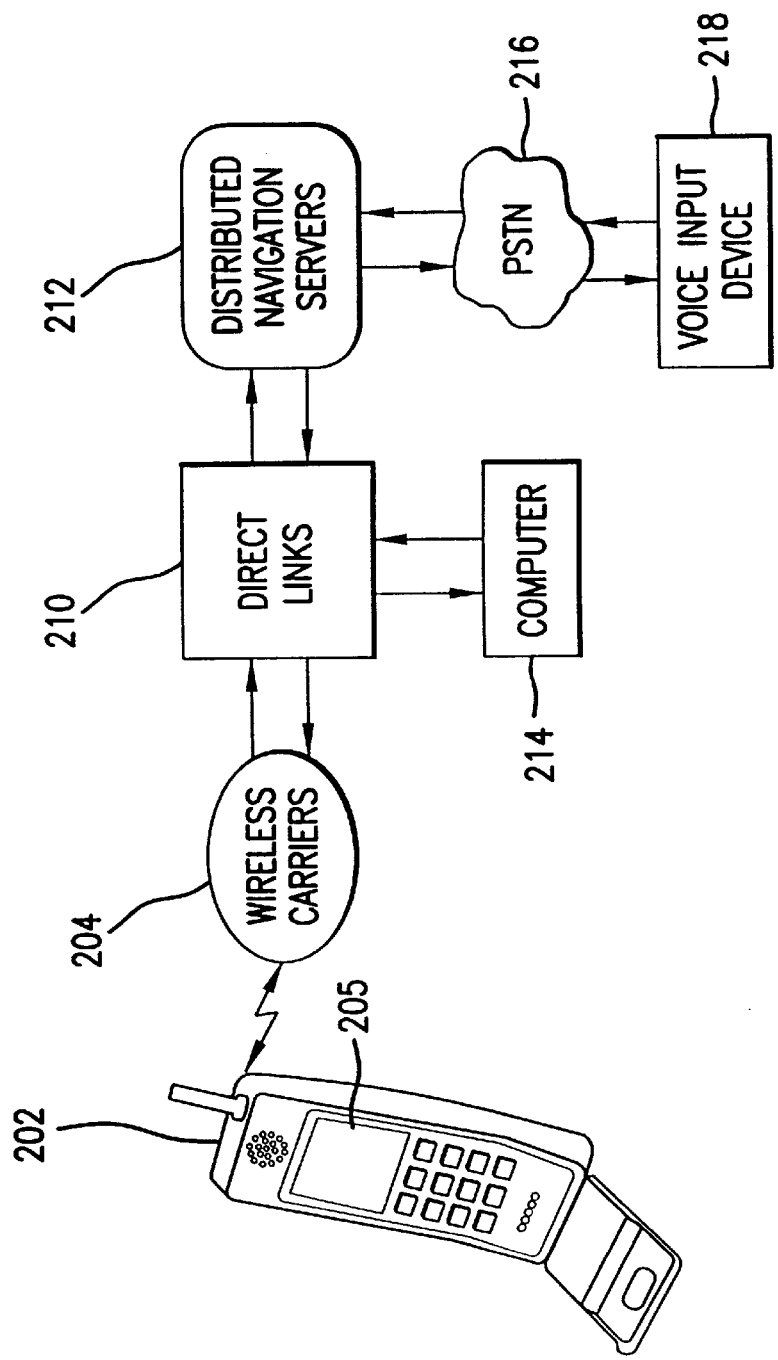
FIG. 2A is a block diagram of an alternative system architecture for an interactive real-time distributed navigation system in an embodiment of the invention.

An alternative embodiment for the system architecture of the present invention is shown in FIG. 2A. As illustrated in the figure, wireless device 202, wireless carrier 204 and distributed navigation servers 212 are substantially the same as described for FIG. 1. Direct links 210, however, provide an alternative embodiment to the function of gateway 206 and network 208 of FIG. 1. The direct link architecture is applicable where Internet infrastructure is not well established or fast response is desired for user navigation or other location specific information services. Illustratively, T1, Frame Relay, etc. linked by a LAN or WAN are appropriate for direct links 210. In another embodiment, direct links 210 are implemented as dedicated lines. Alternatively, direct links 210 are implemented as hard wired connections between wireless carrier 204 and distributed navigation servers 212 where wireless carrier 204 and distributed navigation servers 212 are collocated in a central office.

The system of the present invention utilizes a pool of information including map, geographical, personal and location information to construct an efficient environment for users of the invention. The present invention includes techniques for improving the operating environment of a navigational system, as described below.

In accordance with one embodiment of the invention, the Wireless Markup Language (WML) in the Wireless Application Protocol (WAP) is used by the system and method. WML in the WAP is the analogue to HyperText Markup Language (HTML) in Internet Protocol (IP). WML is defined in "WAP WML" as maintained by the WAP Forum and accessible at www.wapforum.org. Such document is herein incorporated by reference for all purposes. WML is a tag-based display language providing navigational support, data input, hyperlinks, text and image presentation, and forms. User interfaces (UI) of WAP applications are constructed using a model of a Deck consisting of one or more Cards. Among other things, WML includes elements for a user to provide input and further provides for navigation and task invocation control. Furthermore, WML includes methods of implementing access control for decks of cards.

In summary, WML elements specify markup and structural information about a WML deck where elements may contain a start tag, content and an end tag. Furthermore, WML attributes specify additional information about an element. WML cards and decks can be parameterized using variables. Also, WML decks that violate WML definitions are in error and flagged as such. WML includes navigation and event-handling models. The associated elements allow an author to specify the processing of user agent events.

As is common with markup and programming languages, WML requires strict adherence to a defined set of rules to properly use the language. Thus, a programmer making use of such a language must understand the syntax and apply it properly. In an embodiment of the invention, a WML foundation class is defined that creates a class hierarchy that encapsulates portions of WML and makes it significantly easier to create WML applications in an object oriented manner. Furthermore, this class is useful for both versions of WML currently available (version 1.0 and 1.1) and is adaptable to versions to be developed in the future. An advantage of a foundation class is the efficiency by which a programmer develops useful WML decks. Furthermore, a foundation class reduces the amount of code that must be written to create a WML deck.

Figure 2B:
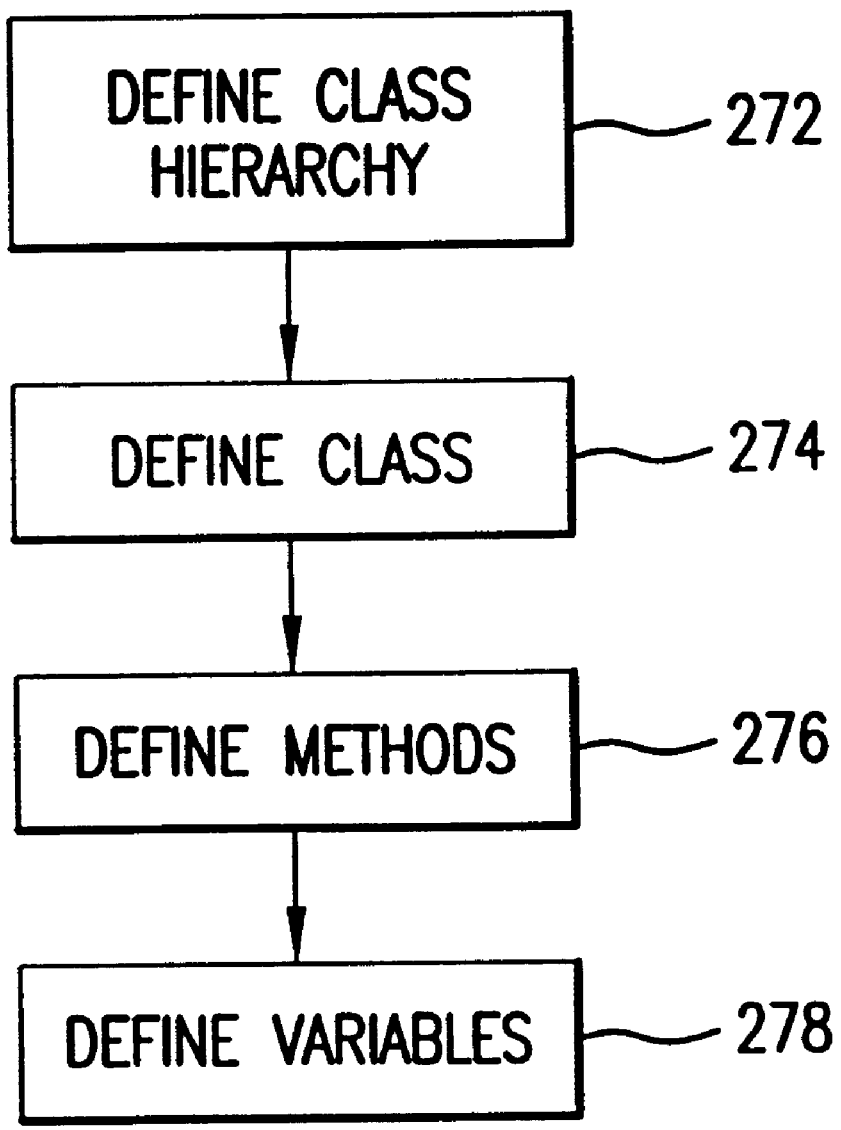
FIG. 2B is a flowchart of a method for defining a foundation class in an embodiment of the invention.

FIG. 2B shows a method for developing a WML foundation class. At step 272, a class hierarchy is defined. In an embodiment, go, previous, no operation and refresh elements are seen as subclasses of task elements, such that a hierarchy is natural. Other elements within WML are similarly organized. A generalized class of objects is defined at step 274 from this hierarchy including the kind of data it contains and any logic sequences that can manipulate it. Furthermore, at step 276, the methods for implementing the logic sequences are defined and, at step 278, the variables are defined. Thus, the methods and variables provide the language instructions.

Through the use of the foundation class of the present invention, a programmer creates the necessary user interfaces and controls. Furthermore, the programmer is able to control how decks respond to the controls called event handling. The foundation class of the present invention is developed to contain all the necessary code for proper implementation of WML. Thus, coding using the foundation class creates listings shorter than using only WML, but with all their functionality. In an embodiment of the invention, the foundation class is a close relationship between the foundation class and WML such that there is little performance penalty imposed by its use. Thus, in programming terms, implementation of the foundation class does not incur a large overhead cost.

Figure 2C:
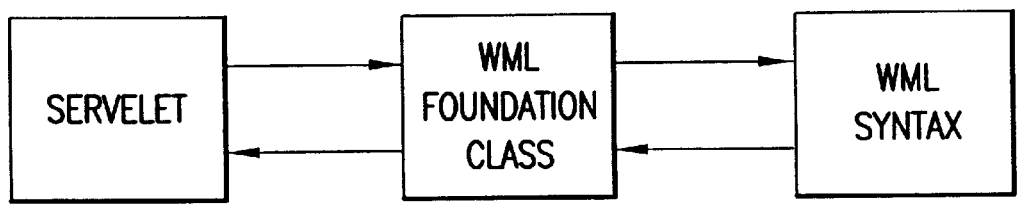
FIG. 2C is a block diagram illustrating the interaction between a servelet and a WML syntax through the use of a foundation class in one embodiment.
Figure 2D:
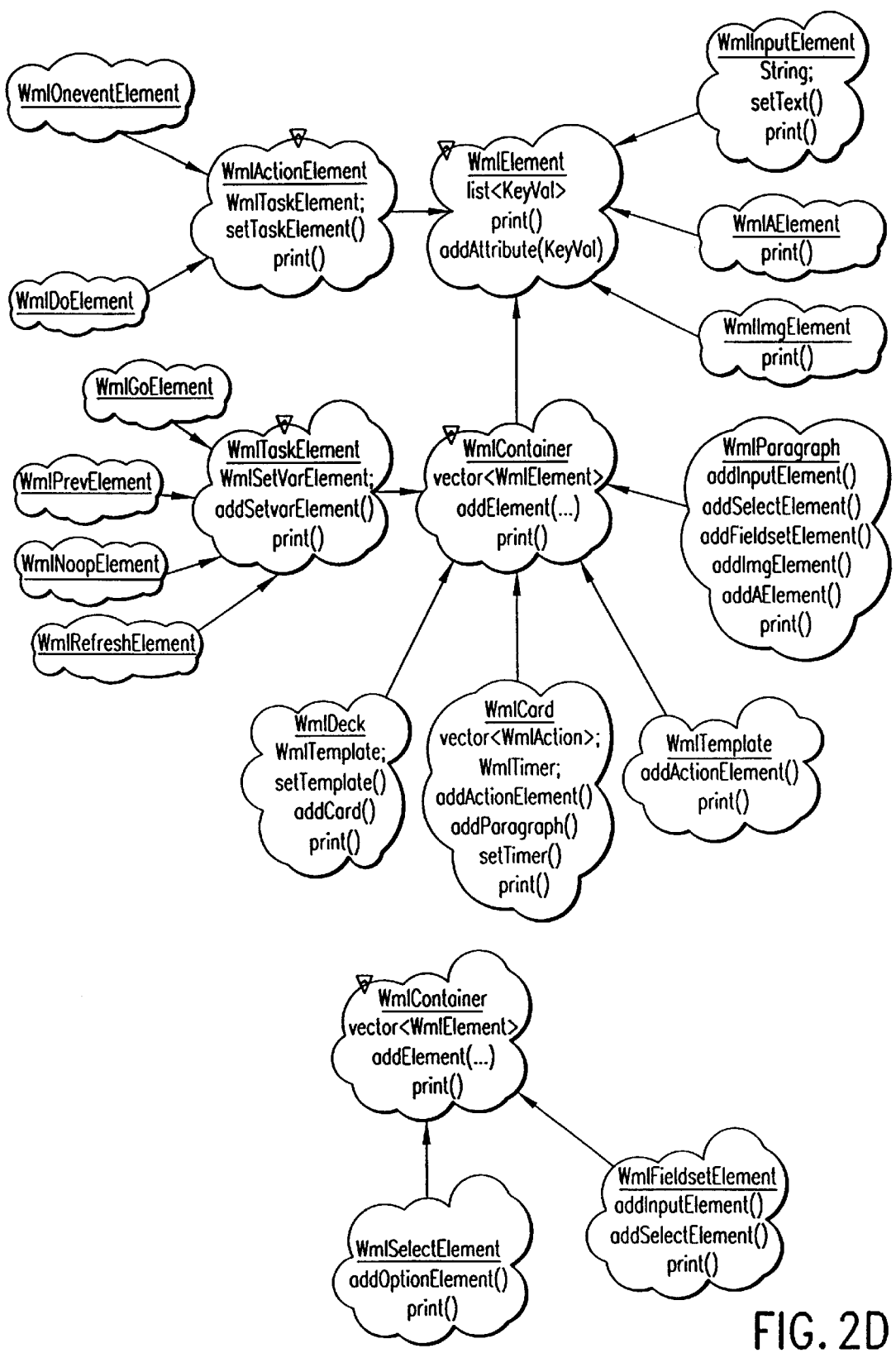
FIG. 2D is a diagram illustrating the hierarchy of elements within a Wireless Markup Language foundation class.

An advantage of the WML foundation class used in accordance with the present invention is that its hierarchy contains the necessary and proper syntax in an optimized manner, such that a programmer need not burden himself creating an ideal syntax for a particular application. An embodiment of the invention is shown in FIG. 2C, which illustrates the foundation class of the present invention implemented in a Java and server environment. With the WML foundation class 252 in place, a developer need not develop Java servelets directly in WML syntax 256. Instead, a developer creates WML decks and cards in servelet 252 using the WML foundation class 254 to create error-free and robust WML syntax 256 for decks and cards. Thus, WML foundation class adds a layer that isolates the application from the details, syntax and language version. Where the WML syntax changes, the WML foundation class need not change, thus simplifying the task of creating decks and cards. In an embodiment of the invention, the WML foundation class elements include functions to create headers, selection lists, plain text, body, decks, cards, etc. For the purposes of example, a sample listing of Java code is included at Appendix A. In the sample listing, the various WML foundation class elements that are used include: WmlDeck, WmlCard, WmlDoElement, wmlAction, wmlAction.setTaskElement, WmlGoElement, etc. An embodiment of the hierarchy and structure of the WML foundation class of the invention is shown in FIG. 2D. Noteworthy in the elements shown at FIG. 2D and as used in the listing of Appendix A is that the foundation class is a thin layer to the WML syntax such that one familiar with the WML syntax recognizes the corresponding WML foundation class elements. For example, the "WMLGoElement" in the foundation class corresponds closely to the WML syntax "go." The same can be done for the other foundation class elements shown in FIG. 2D. The foundation class, however, provides a more straightforward and robust manner by which an unexperienced programmer can create robust and exotic code with only a fundamental understanding of the foundation class. Furthermore, as the WML syntax changes and evolves, the same programmer need not change his code nor his coding techniques.

In an embodiment of the invention wireless device 202 is configured to receive text messages, where such text messages may include location information such as a street address. It is desirable to provide an improved operating environment by automatically extracting such location information from a text message for use in a navigational system.

Location information is often given as a street address in the form of "firstname lastname, street address, city, state, zip code." Alternatively, the street address is in the form "street address, city, state." Other forms for specifying a location exist, as known in the art, and are intended for use with the invention. For example, addresses in countries other than the United States may have different forms of mail codes or formats, which are generally known.

In a preferred embodiment of the invention, wireless device 202 is configured to receive electronic email or short message service (SMS). In another embodiment, wireless device 202 is configured with web browsing capabilities. In both cases the device thus receives, among other things, text. In such text, location information may be provided, including such as addresses or intersections of streets.

Figure 3:
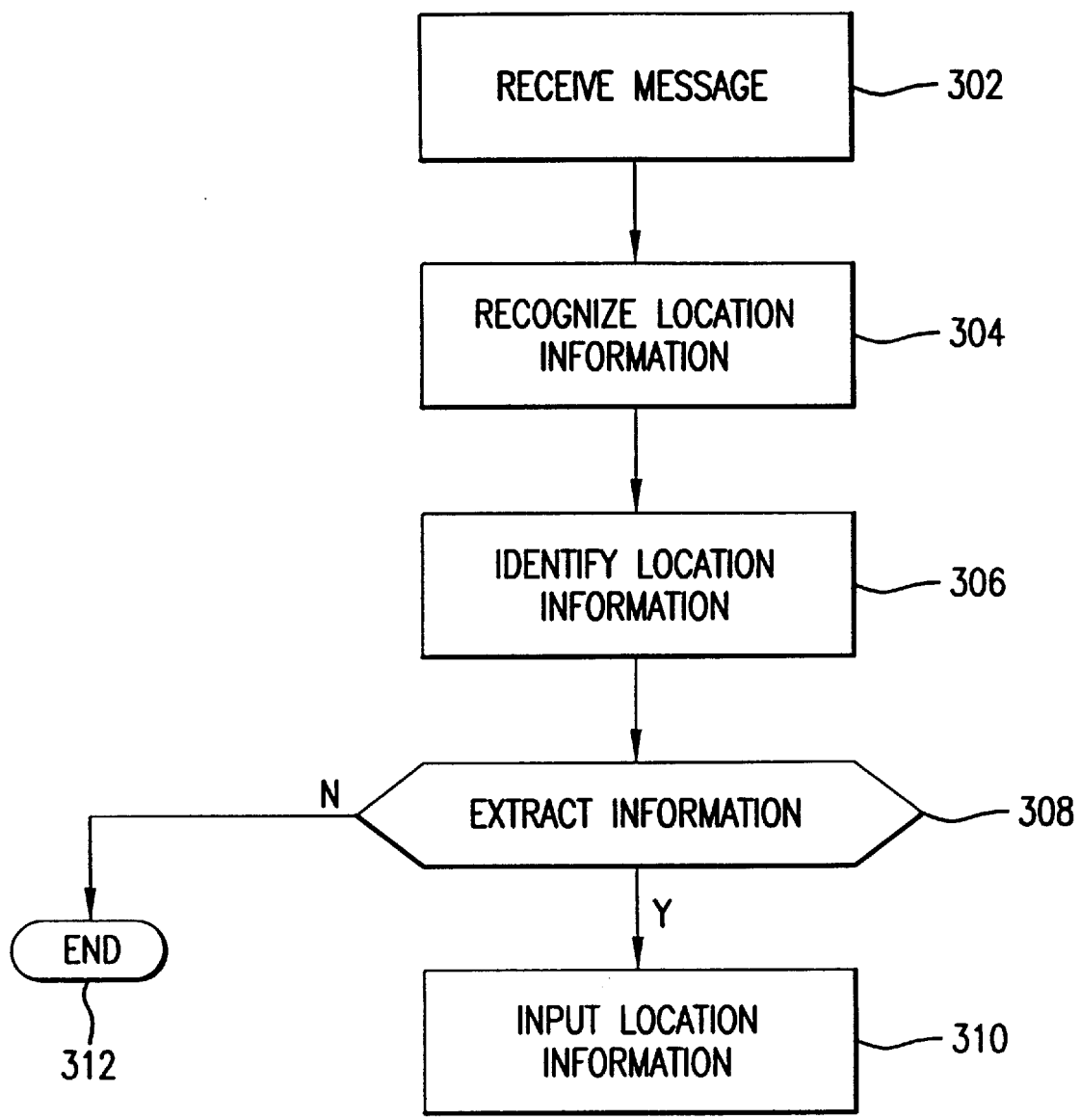
FIG. 3 is a flowchart of a method for extracting location information from a message received on a wireless device 202 in one embodiment.

A method for extracting location information, as made available by any of the above or other available services and received by wireless device 202 is shown in FIG. 3. At step 302, the user receives a message which may contain a text message. The existence of a location information embedded within the message is automatically recognized at step 304 and the information identified at step 306. Illustratively and without limitation, upon identifying a location, the system of the present invention highlights the location information to the user. The user then has the option of extracting the location information at step 308 for input into the navigational system at step 310. Alternatively, the user can disregard the identified location information at steps 308 and 312. In accordance with this invention, input of location information into the navigational system may take various forms. In one embodiment, the location information is directly input into the navigational system and is immediately used to navigate the user to such location. In another embodiment, the location information is stored in the navigational system for later use. Aspects of such an embodiment are described below in the context of a preplanning environment. Alternative embodiments exist without deviating from the invention. Display routines that would direct the user's handling of the received location information may take different forms but are generally straightforward and will not be discussed in further detail.

Location information including addresses is typically made available in the form identified above. In accordance to the present invention, characteristics of a location such as an address are identified for presentation to the user. In an embodiment of the invention, the system identifies the presence of a state name or its abbreviation (i.e., CA for California or NY for New York) within a text message. Having identified a state name, the system proceeds to identify a city, a street address, and/or a recipient name. In another embodiment of the invention, the system identifies a zip code and proceeds to search for other important address information. In yet another embodiment, a street address is first identified, and then other information is extracted and processed. One of skill in the art will understand that variations are possible while keeping within the teachings of the invention.

In another embodiment of the invention, a location is recognized by the insertion of predetermined delimiters, which allow the recognition of location information embedded within an electronic message. Illustratively and without limitation, a location may be encoded as follows: John Smith, @123 Main Street, @Anytown, @CA 94321 where fields of the address are separated by the delimiter. It will be appreciated that other delimiters may be used and different delimiters for each part of the address may be used while keeping within the teachings of the invention. In this embodiment, the present invention searches for the predetermined delimiter and extracts the delimited information. One of skill in the art will understand that not all the information is needed for all purposes. For example in particular circumstances, a very specific location is necessary, such as a specific address. In other situations only a general area information may be sufficient, such as a city or zip code. In either case, the system of the present invention identifies such location information and presents it to the user. The user can then use the location information as needed or desired.

In another embodiment of the invention, location information, which is identified as the intersection of streets, is extracted and utilized. Illustratively, a location can be given as the intersection of "University Avenue and Middlefield Road." In this example, the use of the words "Avenue" and "Road" are used to identify streets. Other key terms may include street, boulevard, way, etc. as well as their associated abbreviations. The location information in the form of street intersections is presented to the user as described previously and utilized similarly. In another embodiment, streets are identified with unique delimiting characters and used in a similar manner.

In a preferred embodiment of the invention, wireless device 202 is configured to input from and provide output to the user. Wireless device 202 is typically of limited input capability, such that extensive user inputs through wireless device 202 may be cumbersome as an operating environment. Therefore, it is desirable to provide an enhanced operating environment, in which the user is required to supply only reduced number of inputs, while using the navigational system. Thus, where a user is driving, for example, an enhanced operating environment in accordance with the teachings of the present invention provides important navigational output with minimal user inputs. It is thus desirable to provide an improved operating environment that allows a user to input complex information through alternative devices ahead of time. The present invention provides an enhanced operating environment that allows the user to input information ahead of time through, for example, a customized web site. Alternatively, the present invention provides an enhanced environment that allows the user to input information by means of voice entries. In an embodiment of the present invention, a navigational system is connected to a server 212 that can also serve as a web server, as shown in FIGS. 1 and 2A. A user interfaces with the system as described previously through wireless device 202. In an embodiment of the invention, users may further interface with the system through a computer 214 connected to the Internet, or using alternative means of communication. In an illustrative embodiment, Computer 214, through the use of a web browser, accesses server 212 to provide user, and preplanning information to the navigational system.

Figure 4:
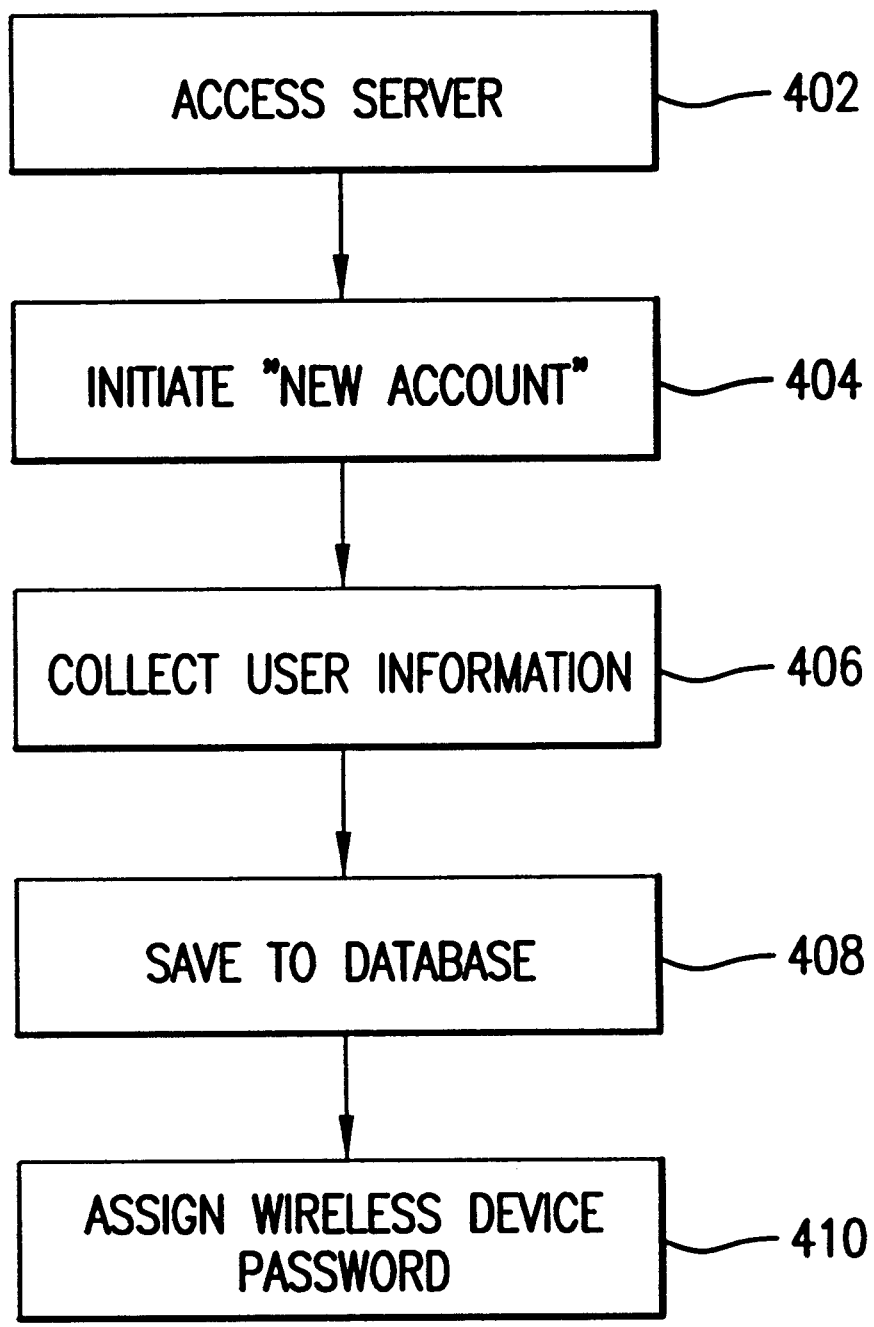
FIG. 4 is a flowchart of a method for creating a new account in an interactive real-time distributed navigation system in an embodiment of the invention.

In providing user information, a user account must first be created using, for example, the method shown in FIG. 4. Using a computer 214 with an appropriate web browser, a user accesses server 212 at step 402. In a preferred embodiment, computer 214 is configured with more computing power and memory than wireless device 202. Upon first accessing server 212 without an existing account, the user is required to create an account by selecting a "New Account" option as shown at step 404. The server then initiates a process at step 406, as is known to those skilled in the art to collect user information including name, address, payment information and other personal information. Preferably, among the information collected at step 406 the system collects the user's login identification and an associated password. The information is then saved at step 408 to a database, which may be located on server 212 or otherwise accessible to server 212, as is known in the art. In an embodiment, an ORACLE database is utilized on a BEA SYSTEMS. The "WEB LOGIC SERVER" operation is generally known in the art and will not be discussed in further detail. At step 410 a wireless device password may then be assigned to the user for subsequent input through wireless device 202. The wireless device password may optionally be selected and entered by the user using computer 214, but it must be approved and recognized by server 212.

Figure 5:
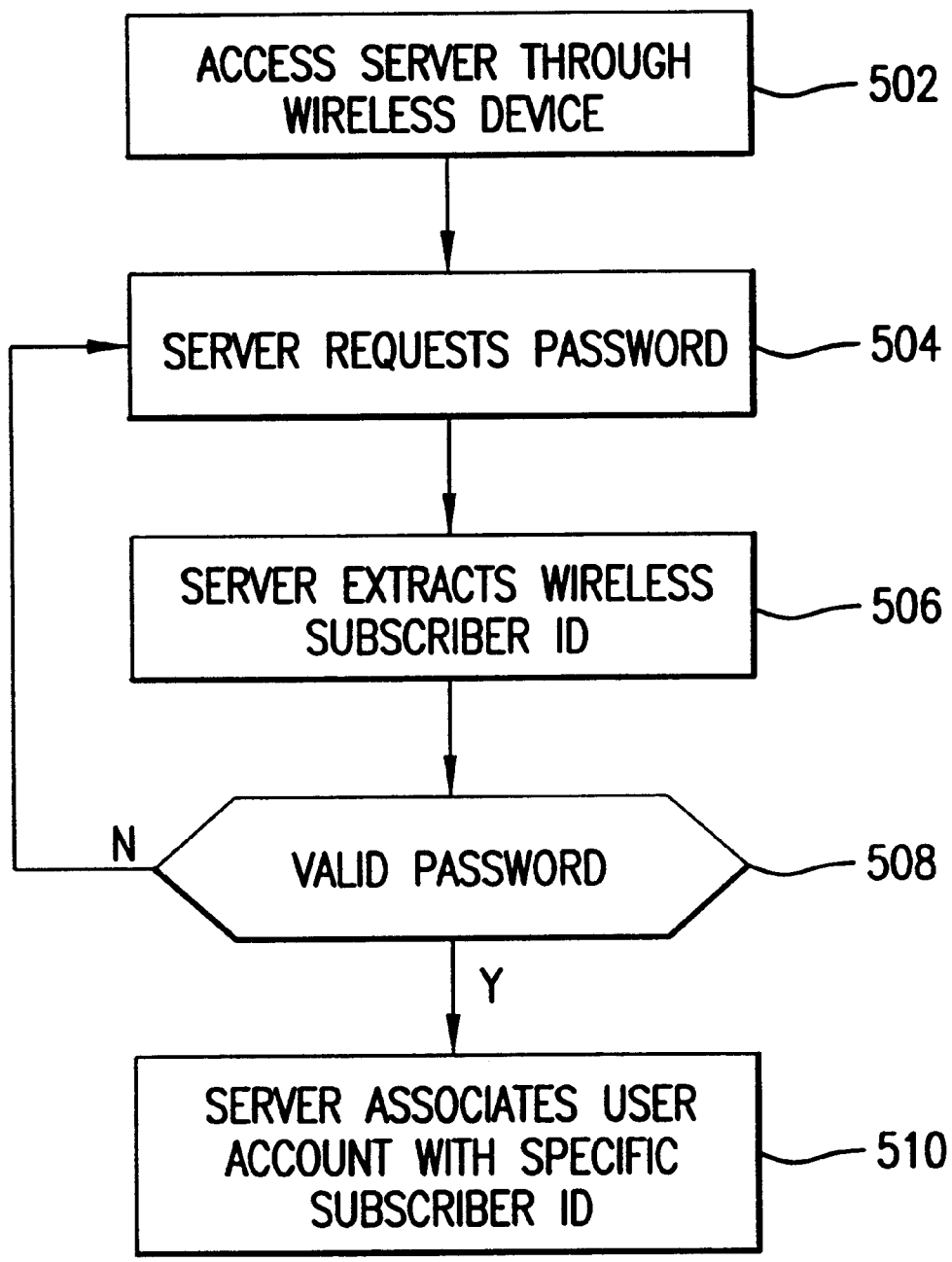
FIG. 5 is a flowchart of a method for automatically logging in to an interactive real-time distributed navigation system in an embodiment of the invention.

With the wireless device password at hand, a user can then proceed to login to navigational server 212 by means of wireless device 202, using a method as shown in FIG. 5. At step 502, a user accesses a navigational server through the use of wireless device 202. Subsequently, as shown at step 504, the server may request a wireless device password, which is supplied by the user. At step 506, server 212 extracts a wireless subscriber identification (ID) from a transmission signal generated by wireless device 202. Such a wireless subscriber identification can be extracted using methods known in the art by the wireless carrier 204, or by algorithms at server 212. Server 212 then proceeds to query its database of valid wireless device passwords at step 508. Upon determination that the password that was entered by the user is not a valid password, the method makes a further request for the user to enter a valid password by re-executing step 504. In some embodiments of the invention, limited numbers of re-executions are available, before the entire process is aborted. Where a valid wireless device password is recognized, server 212 then associates a user's account with a specific wireless subscriber identification at step 510, such that any time a user accesses server 212 using wireless device 202, the user is authorized as a valid user without having to proceed through a cumbersome login procedure.

Other embodiments are possible without deviating form the teachings of the invention, where, for example, a particular user owns various wireless devices that he uses to access server 212. In such a situation, the various wireless devices through their wireless subscriber identifications may each be associated with a single user account. Other embodiments reduce the number of entered inputs to login to the system without completely eliminating all inputs, thus providing a simplified login procedure preferably without complete automation. For example, a completely automated procedure may be balanced with security concerns by requiring a user to provide some kind of input, such as a short password or personal identification number, as well as transmitting a wireless subscriber identification. One of skill in the art will recognize that other embodiments are possible without deviating from the invention.

Figure 6:
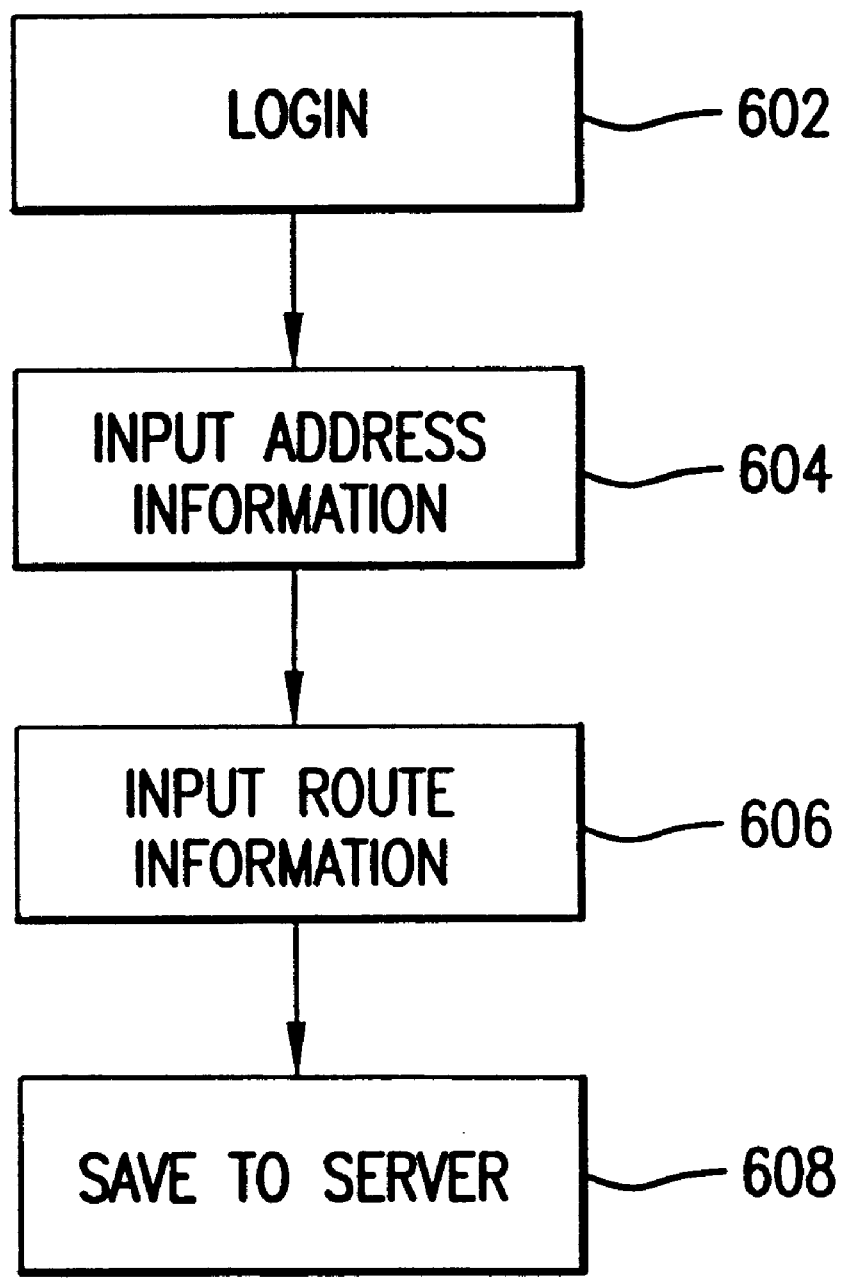
FIG. 6 is a flowchart of a method for providing pre-planned information to an interactive real-time distributed navigation system in an embodiment of the invention.

A method for preplanning used in accordance with this invention is shown in FIG. 6. Using a computer with an appropriate web browser, a user logs into server 212 at step 602. Where a user has an existing account, a user is then able to input destination information at step 604 or route information at step 606. As illustrations, without limitation, a destination is input as an address or an intersection of streets that define a geographic point. As a further illustration, without limitation, a route is a path between at least two endpoints where intermediate points exist between the endpoints. As is known in the art, there exist many techniques for inputting information through a web page. In an embodiment, user computer 214 is configured with more computing power and memory than wireless device 202. As such, computer 214 is used to input and utilize complex navigational information. Illustratively, computer 214 displays to a user available information gathered from a larger pool of information including map, geographical traffic pattern and personalized information. Such information can then be used to provide input to the navigational system for later use through wireless device 202.

For example and without limitation, a personalized map of a user's local neighborhood is displayed on computer 214. Through a computerized search a destination may be identified, such as Mom and Pop's Antique Shop in a city several miles away. In preplanning a trip to Mom and Pop's Antique Shop, a user may preplan his trip from beginning to end. In this example, a user wanting to go after work to purchase an antique vase with an empty gasoline tank can preplan his trip including any intermediate destinations, such as a stop at the nearest gasoline station.

Figure 7:
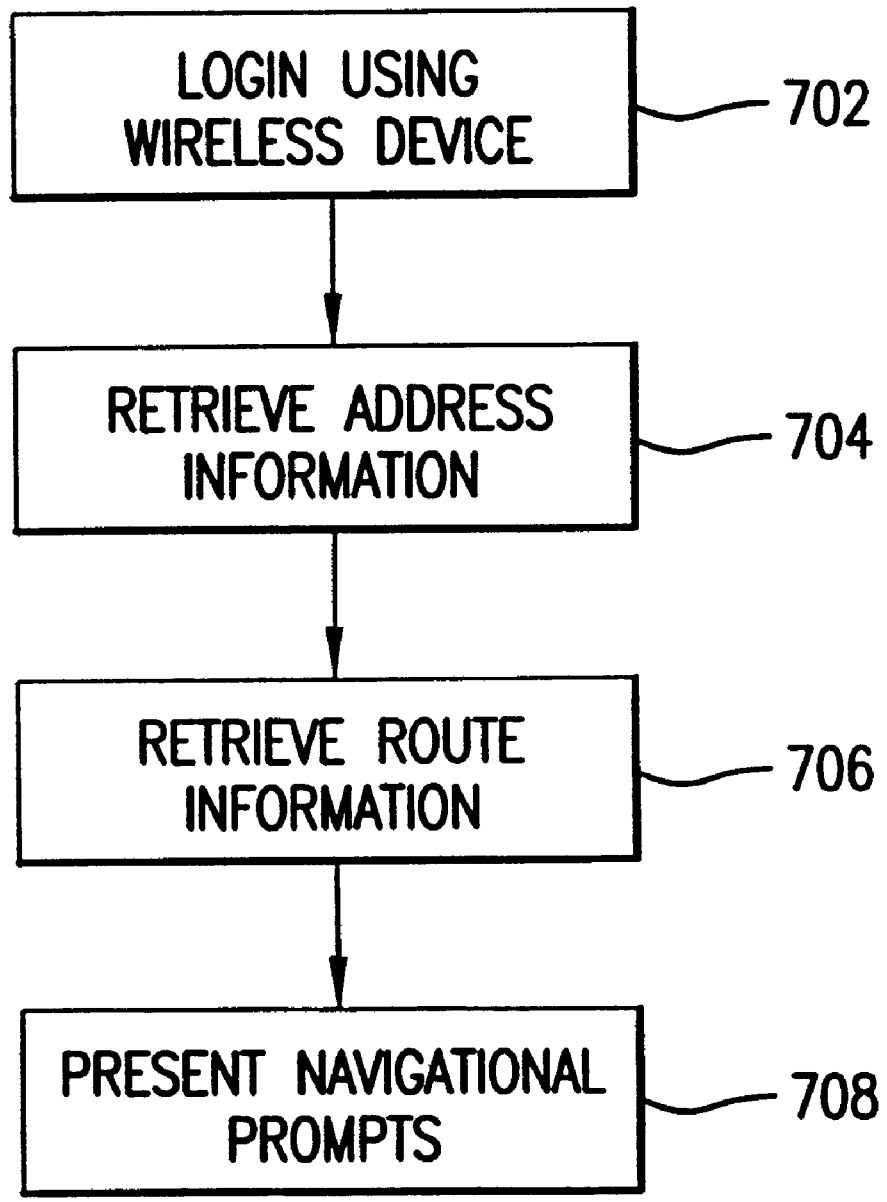
FIG. 7 is a flowchart of a method for retrieving pre-planned information from an interactive real-time distributed navigation system in an embodiment of the invention.

After appropriate input and modification of any inputs, which may be entered manually, or through a graphical user interface (GUI) on a displayed map, the information is saved to the server 212. The user is then able to retrieve preplanned information through wireless device 202 as shown in FIG. 7. Using wireless device 202, a user logs into the navigational system at step 702. Among other options, the user is able to retrieve pre-entered address information at step 704 or pre-entered route information at step 706. Paced navigational information is then presented to the user at step 708. In an embodiment, the pace of presenting information to a user is determined by a user's instantaneous position, which is determined by a GPS or other service. In another embodiment, the user determines the pace of presenting information by depressing a "Next" button upon the need for further navigational information, by scrolling down through a sequence of steps, or by other means.

Thus, a user's preplanned information is collected and stored to provide an enhanced operating environment, where a user need enter minimal information through a wireless device 202, while receiving a large amount of information in a paced manner suitable for navigation while, for example, walking or driving.

In another embodiment, a "fuzzy" location for an origin or destination is entered such that a path, i.e. shortest path, is generated. A fuzzy location can be, but is not limited to, a non-specific location or a description for a set of various locations. Applications include, but are not limited to: fuzzy origin to specific location; specific origin to fuzzy destination; and fuzzy origin to fuzzy destination.

Figure 8:
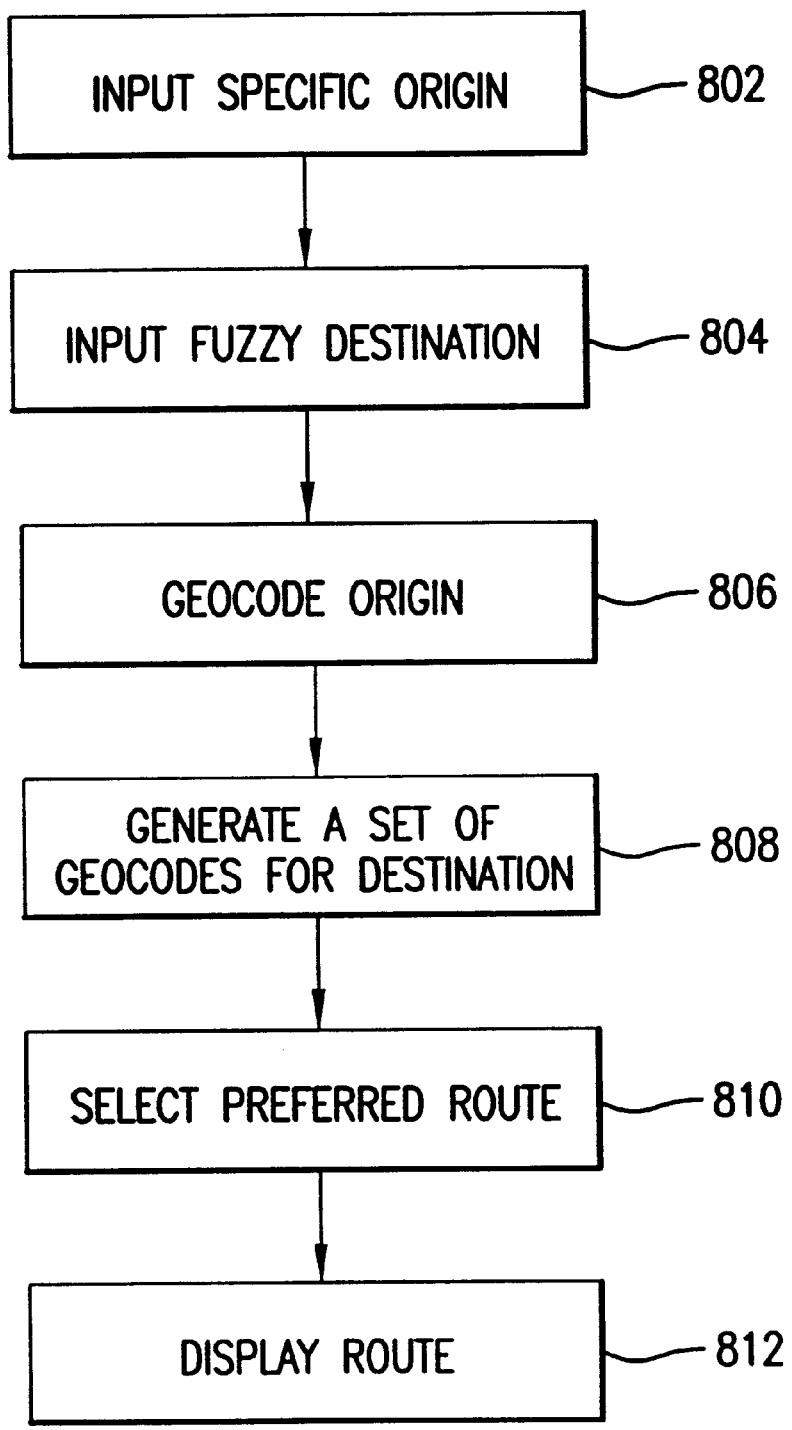
FIG. 8 is a flowchart of a method for inputting a fuzzy origin or destination to an interactive real-time distributed navigation system in an embodiment of the invention.

A method for generating a route from a specific origin to a fuzzy destination is shown in FIG. 8. At step 802 a specific origin is input. As is known in the art, a specific location, such as an originating location, can be input in various manners, such as a street address or an intersection of streets. At step 804, a fuzzy destination is input. In one embodiment, a fuzzy destination is a street or highway, i.e., University Avenue or Highway 101. In an embodiment, the fuzzy location is any location on such a street or highway, an intersection with an identified street, or onramp to an identified highway. Furthermore, a fuzzy location may be a predetermined set of locations specified by the user, system administrator, or server. In such an embodiment, a fuzzy location can be identified by a name, such as "gas stations" so that the server identifies a predetermined set of gas stations as destinations. Other embodiments of fuzzy locations exist without deviating from the invention as will be obvious to those skilled in the art.

Upon receiving a specific origin, the origin is geocoded at step 806 using methods known in the art. Furthermore, a set of geocodes is generated for the fuzzy destinations. For example, for a street, a set of geocodes is generated for each intersection with such street; for a highway, a set of geocodes is generated for each on-ramp; for a predetermined set of locations, a set of geocodes is generated for each location. At step 810, the server then selects a preferred route where the preferred route is determined through a predetermined criteria. Such criteria include, but are not limited to: shortest route, fastest route, heavily traveled route, lightly traveled route, or other criteria, as is known in the art. Upon identification of a preferred route, such a route is displayed to the user at step 812.

One of skill in the art will appreciate that the method of FIG. 8, without deviating from the teachings of the invention, is further applicable to a fuzzy origin with a specific destination and a fuzzy origin with a fuzzy destination. Furthermore, one of skill in the art appreciates that the method of FIG. 8 is applicable to a web-based navigation system or a wireless-based navigation system.

In another embodiment, information is input to the system using voice input. FIG. 2A shows the architecture of such a system where a navigational system is connected to a server 212. A user interfaces with the system as described previously through wireless device 202. In an embodiment of the invention, a user may further interface with the system through the use of voice input device 218. As shown in FIG. 2A, voice input device 218 is connected to PSTN 216 which is in turn connected to server 212. Voice input device 218 can take different forms, such as a wireline telephone or a wireless telephone. In fact, wireless device 202 can be used in voice mode for this purpose. Among other things, server 212 is equipped with an interactive voice response (IVR) unit, which is able to process voice inputs for input into a navigational system. Manufacturers of appropriate voice response systems include NUANCE with its voice recognition engine "Speech Object", FONIX with its product "ACCUVOICE", and INTEL with its product "DIALOGIC", and others.

In implementing an IVR in a navigational system, numbers, city names and especially street names produce large grammars, which increases processing complexity and reduces IVR accuracy. When using voice recognition engines to recognize an input with complex grammar, a computer system must resolve the ambiguity resulting from multiple components and the interaction of them. For example, an address such as "298SUNNYVALE AVENUE, SUNNYVALE, CALIFORNIA" contains a component to recognize numbers, streets, cities and states. An error in recognition in one section, such as number, adversely affects the accuracy in another section such as the street, and vice versa. Because of the large number of possibilities in numbers and street name, the interaction can lead to many similarly sounding combinations and result in low accuracy in voice recognition. For example, a large metropolitan city such as San Jose, Calif., requires a large amount of computing resources and memory. Furthermore, the time required to process the large street grammars introduces unacceptable delays in user/system interaction. Furthermore, for large street grammars, the recognition accuracy is far below an acceptable level. It is therefore desirable to produce a reduced grammar for use with the navigation system from a large grammar. In one embodiment, a reduced street grammar is produced from a large street grammar. In another embodiment, a reduced city grammar or number grammar is produced from associated large grammars. In the following description, detailed reference will be made to street grammars, however, one of skill in the art understands that other applications are possible while keeping with the teachings of the invention.

Figure 14:
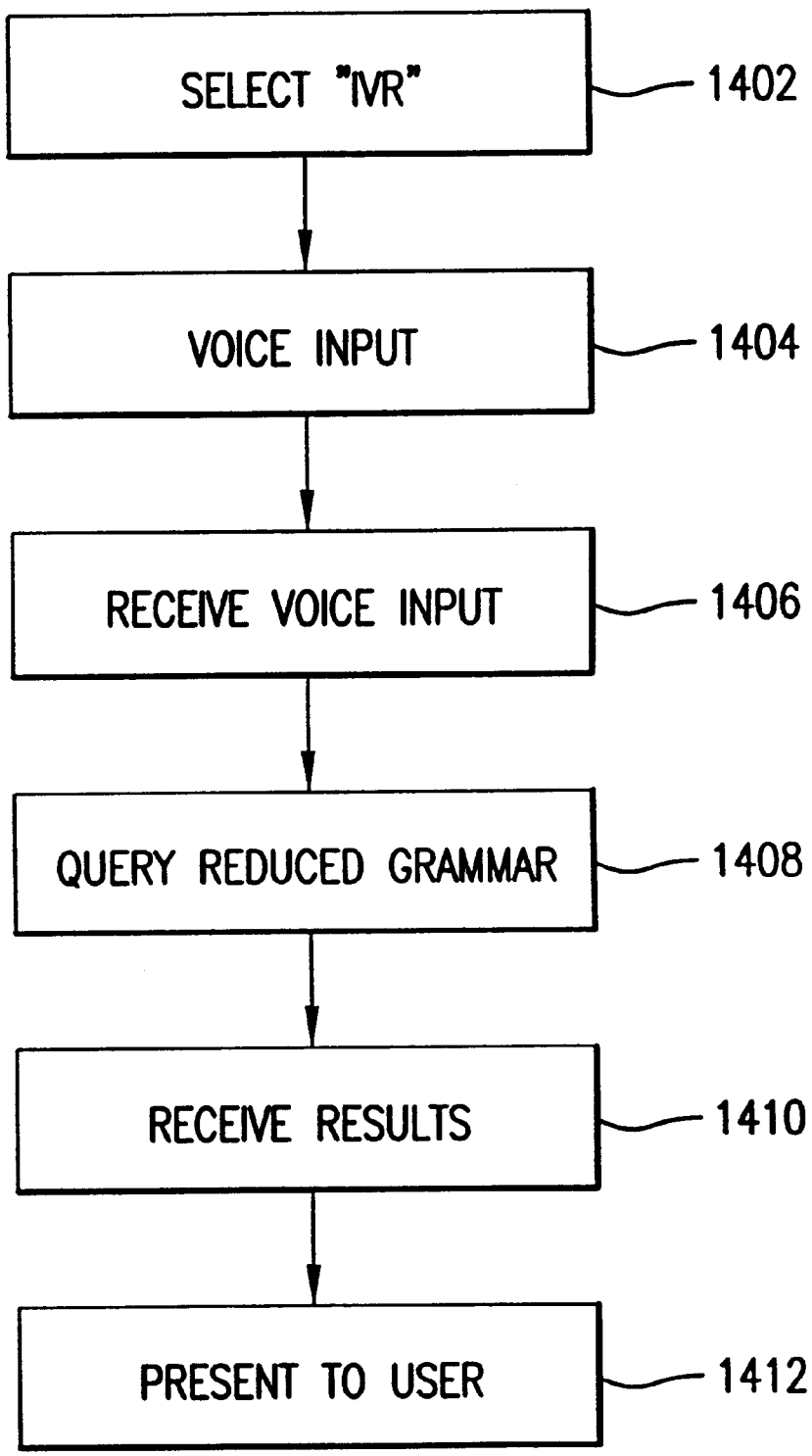
FIG. 14 is a flowchart of a method for querying a reduced voice grammar to improve voice response capabilities in an interactive real-time distributed navigation system in an embodiment of the invention.

A method for implementing a reduced grammar for use with the navigation system is shown in FIG. 14. At step 1402, a user desiring to input voice information using wireless device 202 selects an "IVR" or similar option. At step 1404, the user can then proceed to provide voice input to the system. In an embodiment of the invention, a user enters a complete address such as "298 SUNNYVALE AVENUE, SUNNYVALE, CALIFORNIA". One of skill in the art appreciates that the method of the present invention is appropriate for entry of other types of location information such as the intersection of streets. At step 1406, a server receives the voice input to query a reduced grammar at step 1408. In an embodiment of the invention, the number, street name, city name, and state are processed separately using separate grammars. After processing with the reduce grammars, a complete address is received by the server 212 for use in a navigational system. The received results are presented to the user at step 1412 after which the user can confirm the accuracy of the processed location information.

It has been observed that the average person centers his travels about his home such that the majority of a person's travels are within 25 miles of their home. Put another way, a person's travels are usually local. Furthermore, it is observed that within a typical city or region a small percentage of streets is used a large amount of the time. A characterization of such a phenomena is termed the "80/20" rule indicating that 80% of the time only 20% of the streets are used. An embodiment of the invention uses these observations to introduce a reduced street grammar.

In an embodiment of the invention, a reduced street grammar as used at step 1408 is generated using the above observations. In particular, a reduced street grammar is composed of the most heavily traveled streets in a users home town or home area. Thus, a predetermined threshold serves to define a street grammar composed of heavily traveled streets. In processing a user's voice input to determine a street name, the accuracy and speed of the system is much improved by using such a reduced street grammar. In another embodiment, other criteria, such as speed limits, number of lanes, or traffic signals are used to define a reduced grammar.

In another embodiment of the invention, historical user information is gathered to record frequently used streets. The reduced street grammar is then modified to include user-specific information thus improving street accuracy for each user.

An extension of the observation that a person's travels are usually local is the further observation that a user requiring navigational information usually requires information relating to his present position. For example, a user is more likely to request navigational information when he is lost. Thus, a user's request is related to his present "lost" position toward a specified location. Position information is obtained from several sources including Phase I E911, Phase II E911, or Global Positioning Systems. Additionally, wireless device 202 is used to implement such positioning systems. In an embodiment of the invention, a reduced street grammar is dynamically generated based on the user's present position.

In another embodiment of the invention, at step 1406 a street name is input in conjunction with a spelling or partial spelling of the street name. In the English language, a spelling grammar is composed of as few as 26 letters thus a spelling grammar produces accurate results but is cumbersome to use. The number of letters to be spelled is determined by considering the application under consideration. For example in a large city, improved accuracy is achieved by spelling a larger part of the complete street name. In an embodiment, a voice recognition system is thus tuned to first recognize a name and then its spelling. A user thus inputs a street name such as "SUNNYVALE AVE" by speaking the name "SUNNYVALE AVENUE" and then spelling part of the name such as "S U N". The server 212 then uses both inputs to narrow the grammar size and improve the street name results. In the example being described, voice input of "SUNNYVALE AVENUE" is limited to a street grammar of streets beginning with "SUN". Other embodiments exist without deviating from the invention such as by spelling part of the name first and then pronouncing it.

A method for preplanning using voice input is shown in FIG. 6. Using a voice input device 218 a user logs into server 212 at step 602. One of skill in the art appreciates that several methods of logging in are appropriate. In an embodiment, a user can log in using the touch tone system of a keypad implemented on voice input device 218. Alternatively, a voice recognition system that is implemented on server 212, will recognize a valid user's voice and/or audible inputs. Where a user has an existing account, a user is then able to input address information at step 604 or route information at step 606. As is known in the art, there exist many techniques for inputting audible, including voice and touch-tone, information into a computer such as server 212. After appropriate input and modification of any inputs, the information is saved to server 212 at step 608.

The user is then able to retrieve preplanned information through wireless device 202 as shown in FIG. 7. Using wireless device 202, a user logs into the navigational system at step 702. Among other options, the user is able to retrieve pre-entered address information at step 704 or pre-entered route information at step 706. The user is then presented with appropriate navigational prompts at step 708. In an embodiment of the invention, the system of the present invention lists a user's preplanned information thereby providing an enhanced operating environment, where a user need only enter minimal information, but receive a large amount of information in a paced manner suitable for navigation while driving or walking.

In another embodiment, a user logs in and retrieves information from the navigational system in an audible manner. In such an embodiment server 212 is equipped with voice synthesization capabilities. In this manner detailed navigational information is sent from the navigation system to the user. Such navigational information is identical or similar to information conveyed textually or graphically, except that it is synthesized into an audible signal.

In another embodiment, a user retrieves information in both an audible and textual manner as a user deems appropriate. A user can thus select audible retrieval of navigation information while he is driving through a busy street such that he will not have to remove his eyes from the road. A user can also select text mode when he is walking and safety is not a concern. Furthermore, a user can select dual text and audible mode where he can respond to both types of signals appropriately. Such a mode may be appropriate is residential navigation where a user can quickly respond to audible inputs and then verify navigation after stopping at a stop sign or other safe place.

In another embodiment, distributed navigation servers 212 also receive and process location specific information, such as real-time traffic information. In an embodiment, traffic information is obtained from a group of navigation service users. By observing and comparing their positions, speeds and times, and making further comparisons with nominal street speed limits in a map database, real-time traffic information is generated and then used by the invention. At each juncture towards a destination, the system dynamically determines the optimal route for a particular user responsive to ever changing conditions. For example, where due to changed conditions a first route becomes less optimal, a second route is generated and presented to a user. An optimal route is determined in several ways depending on a user's preference. For example, an optimal route may be based on minimum time, minimum distance or minimum consumption of fuel. In embodiments of the invention, traffic information can be received by servers 212 from a general traffic information center, such as those used by news agencies or can be received in more complex forms from a traffic monitoring service that generates much more complex information, such as speed and direction and may further generate such information in digital form. Processor-intensive functions, such as navigation guide algorithms, are processed by distributed navigation servers 212 so as to reduce the computational burden on wireless device 202. As part of the processing function of distributed navigation servers 212, in one embodiment, these servers provide functions such as conversion between HDML or WML to HTML and vice versa. Such conversion is particularly necessary when using a web site encoded in HTML to pre-plan routes or destinations for later retrieval from wireless device 202 encoded in WML.

In receiving navigational information in an audible manner, an embodiment of the system of this invention allows the user to review and re-review different aspects of the navigational information. For example, navigating from a starting destination (i.e., a person's workplace) toward a final destination (i.e., Mom and Pop's Antique Shop) via an intermediate destination (i.e., a gasoline station) may involve many steps. Receiving all of this information up front can be confusing and not very useful. Thus, a navigational instruction that states "turn right at University Avenue" can be more useful a short period before reaching University Avenue rather than miles away. Accordingly, provisions are made in a preferred embodiment of this invention to provide navigation information as it becomes necessary.

A voice mode of operation of a navigational system is as described above with the wireless device 202 connected to the distributed server via the wireless carrier and the Internet. In order to enhance this mode of operation, a user may select anyone from the following list of exemplary options: rewind/repeat; forward/skip; pause; faster; slower. Where a user desires to review or repeat a certain part of the navigational information being provided, the user selects the "rewind/repeat" option so as to back up to a desired position of the navigational information. Where navigational information is divided into steps, a "repeat" function used in a specific embodiment may provide for review of discrete steps, whereas a "rewind" function may allow a user to review the navigational instructions without regard to the division of steps. Conversely, where user does not need to listen to a particular part of the navigational information, the user may select "forward/skip" option. With such features, the "forward" option is the counterpart of the "rewind" option and the "skip" option is the counterpart of the "repeat" option. In one embodiment, the user further has the option to speed up or slow down the transmission of navigational information through the use of "faster" and "slower" options. One of skill in the art understands that other options for controlling the presentation of navigation information in a voice mode exist, while keeping within the teachings of the invention.

In the embodiments described above, the operation of the system was described in the context of wireless device 202 being continuously connected to distributed server 212. In another embodiment, wireless device 202 only accesses the remaining part of the network when necessary, and thus may realize various savings, including connection costs.

Figure 9:
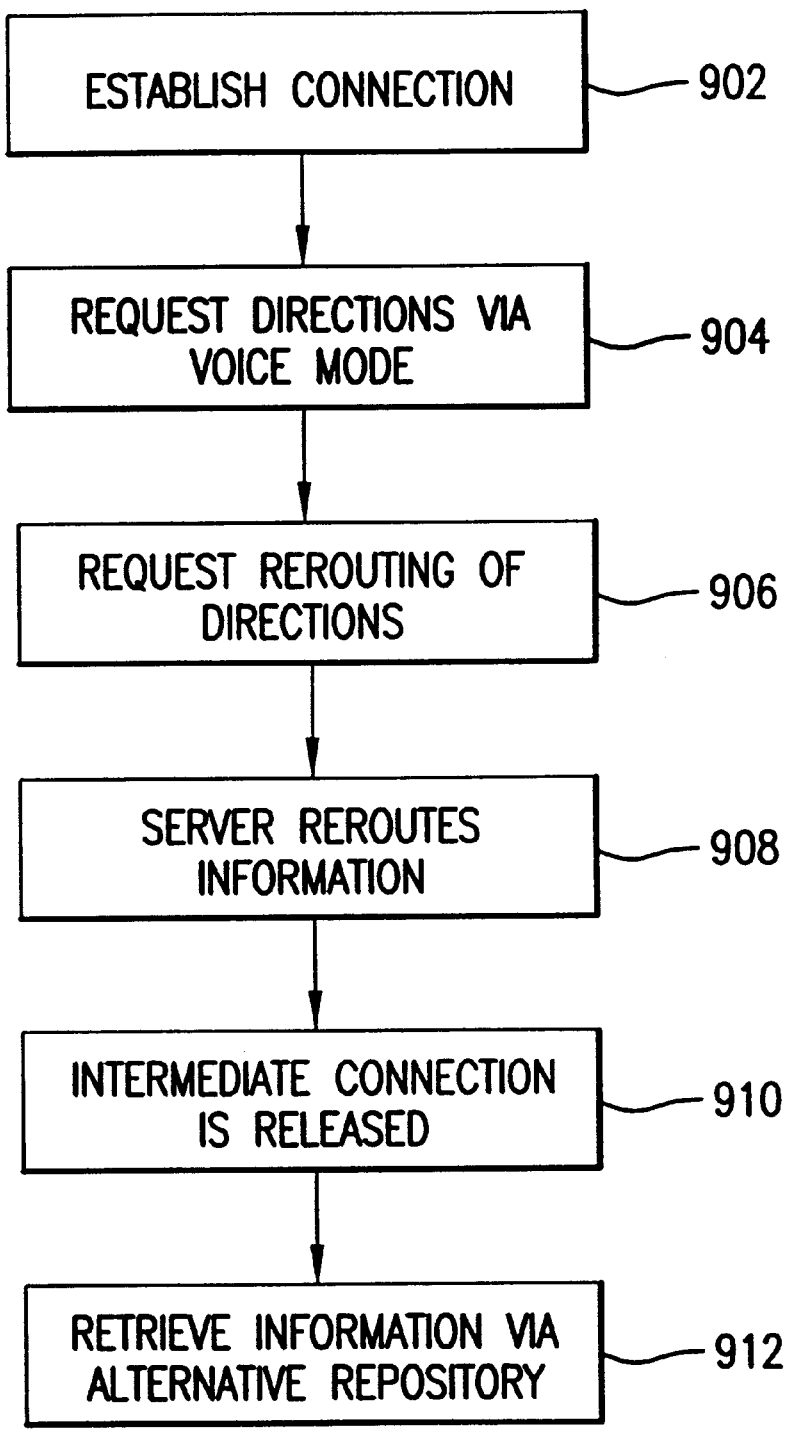
FIG. 9 is a flowchart of a method for saving static navigational information to an alternative repository in an interactive real-time distributed navigation system in an embodiment of the invention.

As shown in FIG. 1, wireless device 202 communicates through a wireless carrier 204, gateway 206 and the Internet 208 with server 212. In one embodiment, one or more of these connections need not be sustained continuously. FIG. 9 depicts a method for reducing the time when a connection between the wireless carrier and the server is sustained through the Internet. Among other reasons, this approach proves beneficial in reducing the connection time through the Internet. Such a method also proves beneficial when there exists a lag or latency in the Internet connection, or where the Internet connection has a high associated cost measured in money, time or other cost factor.

In particular, as described previously, a user establishes a connection with server 212 as normal at step 902. An authorized user can then proceed to request navigation information using, for example, a voice mode of operation at step 904. The user can further proceed to reroute the requested directions to an alternative repository at step 906. In one embodiment, this alternative repository can take the form of a user's wireless voice mailbox or other suitable device capable of storing information. In one embodiment, wireless device 202 is equipped with appropriate memory to be able to record the requested navigational information locally. At step 908, server 212 responsively reroutes the requested information, as instructed by the user. Having rerouted the information, the Internet connection is discontinued, as shown at step 910. The user can then proceed to retrieve the navigational information via the alternative repository, as shown at step 912.

One of skill in the art will understand that the method illustrated in FIG. 9 can further be used to remove the connection from wireless device 202 to wireless carrier 204, where the wireless device has appropriate memory capabilities. In such an implementation, both the Internet connection and the wireless connection are removed, thereby also eliminating the costs associated with the use of the wireless carrier, as measured by money, time or other cost factor.

One of skill in the art will further understand that the method of FIG. 9 can be extended to a text mode of operation where appropriate textual navigation information is redirected and stored appropriately. In this case the user retrieves textual navigational information from an alternative textual repository, thereby eliminating certain associated costs.

In an embodiment of the invention, the navigational system is used in a mobile environment with a wireless device 202 of limited input capabilities. An observation of the use of a navigational system indicates, however, that users often request navigational information for routes previously traveled. In providing an enhanced operating environment, an embodiment of the invention provides for a user to retrieve a number of the most recently traveled routes.

Figure 10:
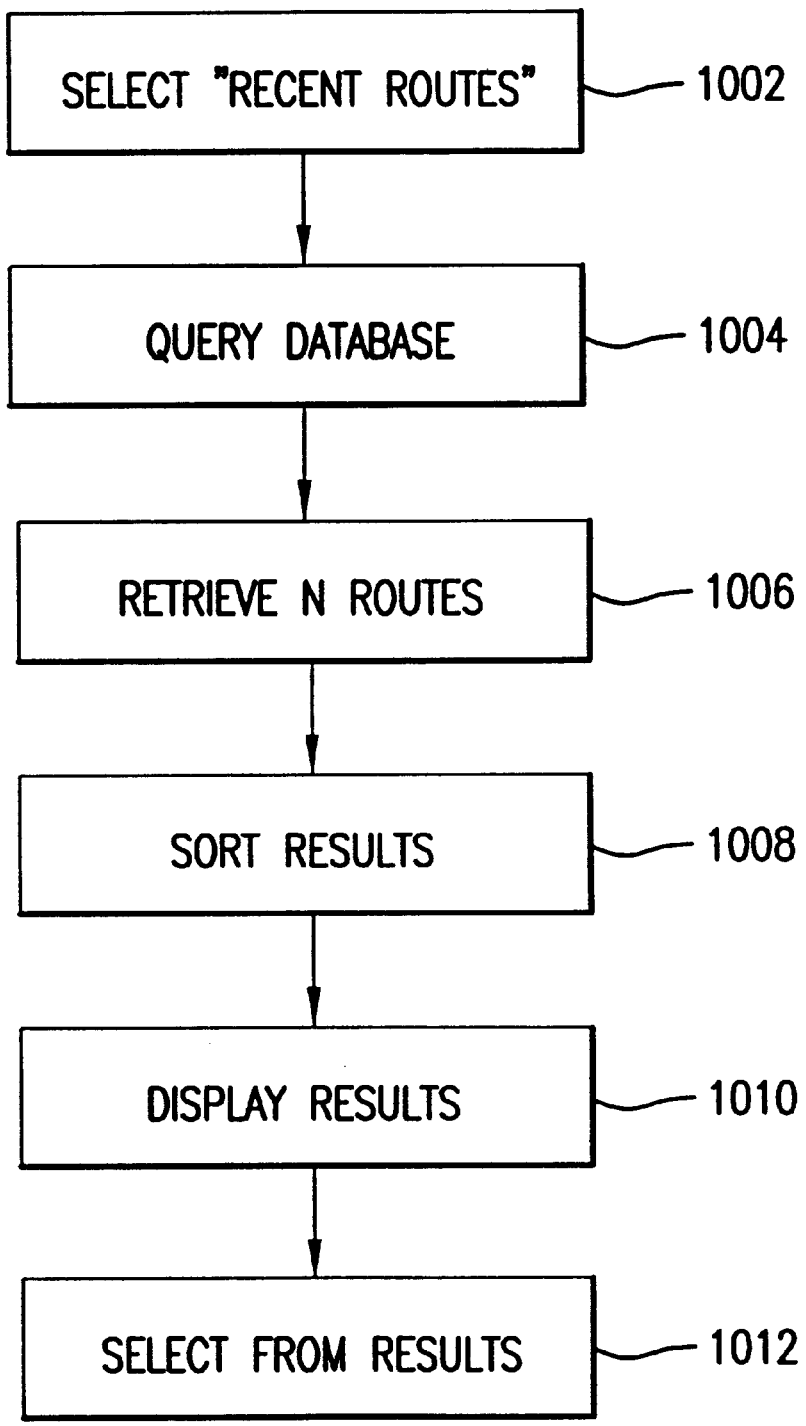
FIG. 10 is a flowchart of a method for retrieving a number of most recent routes traveled from an interactive real-time distributed navigation system in an embodiment of the invention.

A method for retrieving a number of the most recent routes traveled is shown in FIG. 10. Using wireless device 202, a user selects a "Last Routes" option from a list of options at step 1002. Such a selection can be made in a voice mode of operation or a text mode of operation using methods known in the art. Upon the selection, a request will be sent to server 212. At the server, a query is made of a database storing, among other things, a database of information about the user. More specifically, at step 1004 a query is made of the database to retrieve the most recent routes requested by the user. A number N of most recent routes or last routes is retrieved at step 1006. Subsequently, the retrieved number of most recent routes is sorted at step 1008. The manner of sorting can be defined in different manners and may be user specified or system administrator specified. In one embodiment, the N most recent routes are sorted chronologically or reverse chronologically. In another embodiment, the N most recent routes are sorted by distance, from shortest to longest or vice versa. One of skill in the art will understand that other options are possible without deviating from the teachings of the invention.

Upon sorting the N routes, these routes are presented to a user at step 1010. In an embodiment using a text mode of operation, a wireless recognizable page coded in Wireless Markup Language (WML) is present on wireless device 202. In an embodiment using a voice mode of operation, an audible list of options is presented to the user through wireless device 202. Upon perceiving a number of the N routes, the user then selects an appropriate route at step 1012. Subsequent operation of the navigational system proceeds as previously described.

As noted previously, it is desirable to provide an enhanced operating environment, in which the user is required to provided a reduced number of inputs while using a navigational system. It is thus desirable to provide an improved operating environment that allows a user to input complex information through wireless device 202 with a minimum intervention by the user. One embodiment of the invention reduces the number of inputs on a wireless device 202, while leveraging the typically enhanced capabilities of server 212 with an associated database.

A typical telephone uses a labeling convention as defined by ANSI T1.703-1995. As part of the labeling convention, numbers as well as various letters are associated with a key on a telephone keypad as shown below:

| Keypad Label | Associated Numbers and Letters |
| --- | --- |
| 1 | 1 |
| 2 | a, b, c, 2 |
| 3 | d, e, f, 3 |
| 4 | g, h, i, 4 |
| 5 | j, k, l, 5 |
| 6 | m, n, o, 6 |
| 7 | p, q, r, s, 7 |
| 8 | t, u, v, 8 |
| 9 | w, x, y, z, 9 |
| 0 | 0 |
| * | |
| # | |

One of skill in the art appreciates that other labeling conventions are possible. Thus, for entering textual information, keys 2–9 are not deterministic of a single letter. For example, entry of the key "7" is non-deterministic in that there is ambiguity as to whether a user desires to enter the letters p, q, r, s, or the number 7. However, by depressing a key multiple times, a user is able to enter textual data using the telephone keypad. Because more than one letter is associated with any given key, repeated input of an identical key allows a user to scroll through the various letters. For example, where a user desires to enter the letter "s", he must press the "7" key four times. Upon pressing the "7" key once, a "p" can be entered; pressing the "7" key twice, a "q" can be entered; pressing the "7" key three times, an "r" can be entered, etc. Where a user desires to input "298 SUNNYVALE AVE" a user must enter the following sequence: 2222 99999 8888 7777 88 66 66 999 888 2 555 33 2 888 33. Thus, where a complex address or location is to be entered, this method of text entry can be cumbersome especially where textual information is to be entered while traveling in a car or walking. It is thus desirable to use the advanced capabilities of server 212 to assist a user in entering non-deterministic information that is then converted to deterministic information.

Figure 11A:
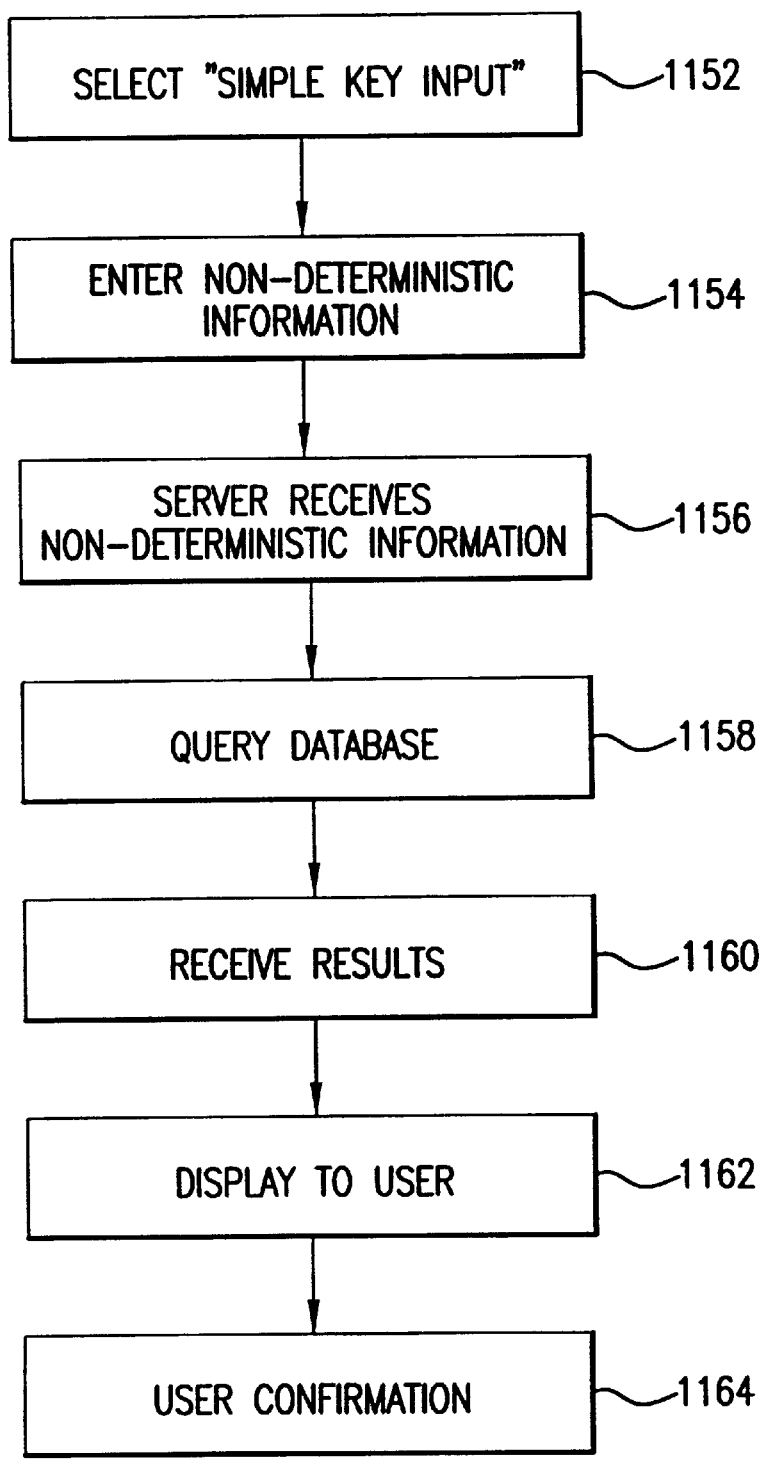
FIG. 11A is a flowchart of a method for inputting non-deterministic information to an interactive real-time distributed navigation system in an embodiment of the invention.

A method for utilizing the capabilities of server 212 to reduce the number of inputs through a wireless device 202 is shown in FIG. 11A. At step 1152, a user desiring to input non-deterministic information using a keypad on wireless device 202 selects a "Simple Key Input" or similar option. At step 1154, the user can then proceed to enter non-deterministic location information. In one embodiment, a user enters a complete address, however, one of skill in the art appreciates that the method of the present invention is appropriate for entering other textual information. In an embodiment of the invention, a user enters non-deterministic information by entering key inputs associated with a letter without multiply entering the same key. For example, where a user desires to input "298 SUNNYVALE AVE" the user need enter only the following sequence: 2 9 8 7 8 6 9 8 2 5 3 2 8 3. Thus, the user need only make 12 entries as opposed to 28 entries in the prior art.

In another embodiment, a specialized syntax is implemented to identify whether, for example, address or inter-section information is being input. For example, in this embodiment, the "star" key (*) indicates that address information is to be input and further functions as a delimiter. Thus, "298 SUNNYVALE AVE" is input as the sequence: *298*78698253*283*. In another embodiment, a different delimiter, such as the "pound" key (#) indicates that inter-section information is to be input. Thus, the information "SUNNYVALE AT WASHINGTON" is input as the sequence: #78698253#9274464866#. In other embodiments, such delimiters are further used to delimit the input of city, state and mail code information.

At step 1156, a server receives the non-deterministic information to query a database of information at step 1158. In one embodiment, the database contains indexed information between a numeric sequence and location information, such as streets or cities. A server then receives a list of results at step 1160. In one embodiment, the database considers a user's personal information and uses such as default information to reduce the number of queries and to limit the number of results at step 1160. For example, where a user is located in a particular city, the database gives priority to streets in that city. Furthermore, delimiters such as those described above assist in the determination of default information. For example, where missing city or state information leads to using predetermined default information. At step 1162, the list of results is displayed to the user. The user then makes a selection of the correct input at step 1164.

One of skill in the art will appreciate that modifications of the method shown in FIG. 11A are possible without deviating from the invention. For example, the method of FIG. 11A can be implemented upon entry of each input, such that upon entry of each input a list of possible results is generated. Upon reaching a predetermined threshold of results, such list of results is presented to a user for selection.

The method of FIG. 11A has been described for entry of address and location information, however, one of skill in the art will appreciate that the method is appropriate for other types of text entry. Furthermore, the present invention is appropriate for applications where a database of indexed numeric sequence to letter sequences can be maintained to narrow the non-deterministic mapping to a manageable number of choices appropriate for user presentation and selection.

Figure 11B:
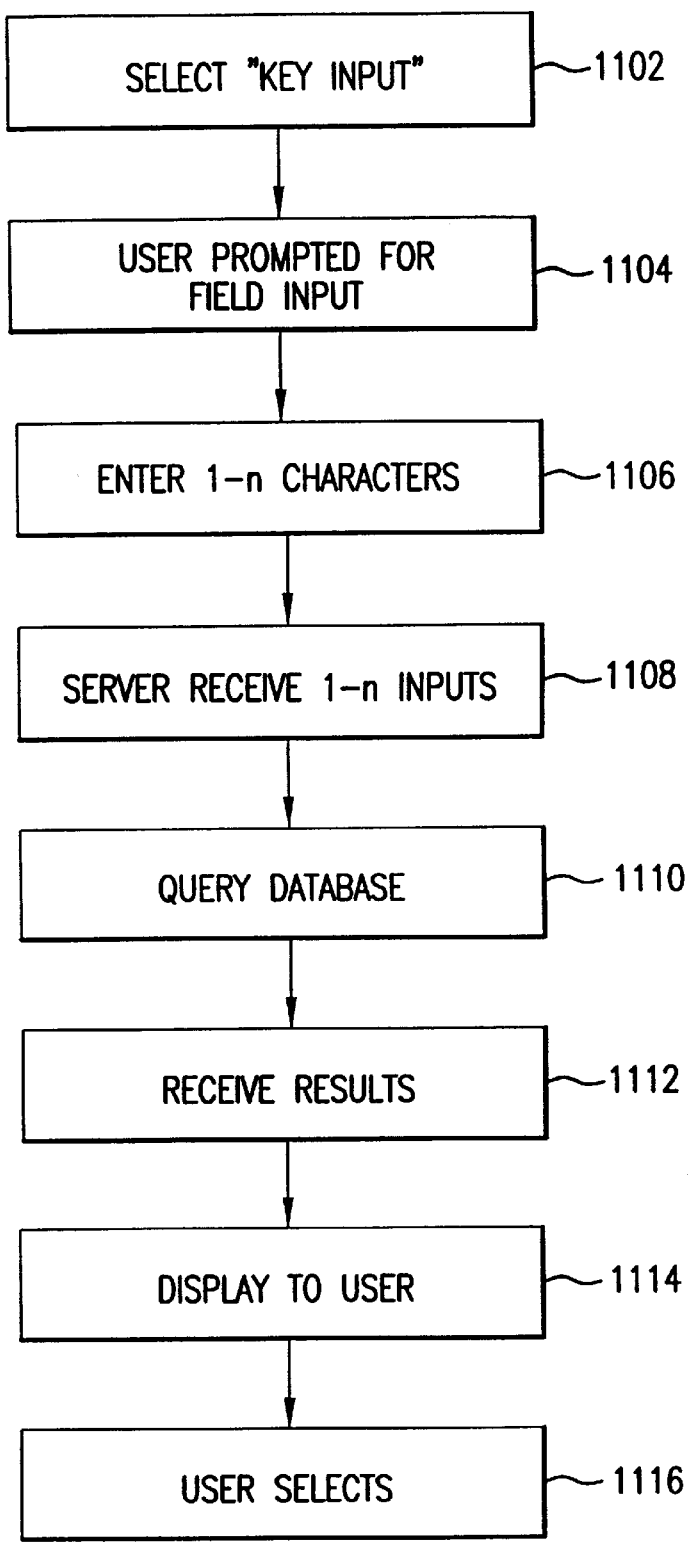
FIG. 11B is a flowchart of a method for implementing a server-based location input to an interactive real-time distributed navigation system in an embodiment of the invention.

A method for utilizing the capabilities of server 212 to reduce the number of inputs through wireless device 202 is shown at FIG. 11B. At step 1102, a user desiring to input information using a keypad on wireless device 202 selects a "Keypad Input" or a similar enabled option. At step 1104 the user is then prompted to provide inputs for an identified field. The identified field is used to determine a location and may include street address, city, state, mail code, street intersection, or other location input as known in the art. For the purpose of illustration without limitation, an identified field is the name of the desired city. Also for the purpose of illustration without limitation, a user inputs information using a telephone keypad labeling convention of ANSI T1.703-1995. Where the city to be input is "Palo Alto," a user enters 1–n letters at step 1106. The server then iteratively receives the 1–n inputs at step 1108 and uses such information to query a database of information at step 1110. In the present example where the name of the city is to be entered, a query will be made of a stored list of cities. From the database, a number of results will be retrieved at step 1112 corresponding to the inputs received. In a particular situation, a small number of results will be retrieved after only one input such that the small number of results is presented to the user at step 1114. However, in other situations more inputs will be necessary to reduce the number of candidates to a predetermined manageable number. After enough inputs are received and the number of candidates is reduced, a list is presented to the user at step 1114. The user then selects from the displayed candidates at step 1116.

In an embodiment of the invention, upon receiving database results responsive to one input letter at step 1112, the server determines a number of how many more letters are needed to determine the field, in this case the city, with a predetermined number of manageable results. In another embodiment of the invention, system performance is enhanced by analyzing the database of fields (i.e., cities) beforehand. Thus, the system is able to retrieve, among other things, pre-processed information as opposed to having to process all necessary information in real-time. Furthermore, system performance is further enhanced by utilizing user-specific information. For example, a user's identified telephone number is associated with a particular location identified by a city and a state. Other user specific information can further be pre-entered using wireless device 202 or other input methods as known in the art.

In another embodiment, the server in conjunction with the associated database can pre-store and pre-analyze common city prefixes to reduce the amount of real-time computing effort required while a user is entering field information. For example, common prefixes include, but are not limited to, "Los," "San," and "Santa." Thus, where the user enters "S" and "A" as the first two inputs, such inputs have been pre-processed such that the method as shown in FIG. 11B is accelerated and improved. Other modifications are also available without deviating from the invention as is known to one of skill in the art. As noted previously, it is desirable to provide an enhanced operating environment, in which the user is required to provided a reduced number of inputs while using a navigational system. It is thus desirable to provide an improved operating environment that allows a user to input complex information through wireless device 202 with a minimal user input. An embodiment of the invention identifies and saves a user's current location for later use and retrieval.

Figure 12:
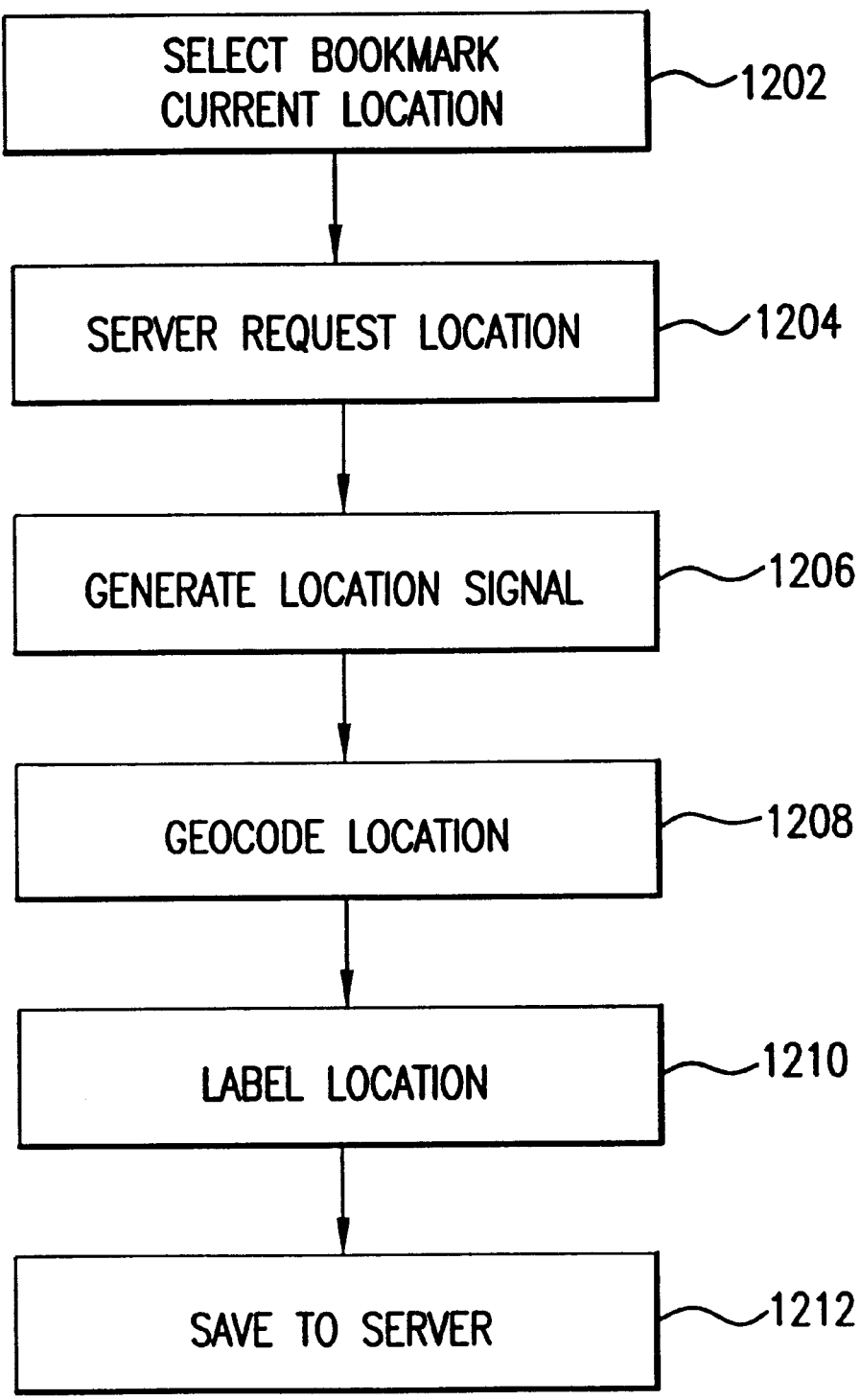
FIG. 12 is a flowchart of a method for bookmarking a current location in an interactive real-time distributed navigation system in an embodiment of the invention.

A method for bookmarking a user's current location is shown at FIG. 12. At step 1202, a user desiring to label his current location selects a "Bookmark Current Location" or similar other option. Upon selecting such an option, the server then requests the user's location at step 1204. In one embodiment, such a request is routed through a location gateway that provides, among other services, geo-location for a user equipped with a GPS or similarly enabled enabled wireless device 202. The appropriately equipped wireless device 202 generates a location signal at step 1206, which is then received and geo-coded at step 1208. At step 1210, the user is then requested to label his current location. The user can provide appropriate input through a keypad on wireless device 202 or, where appropriately configured, through a voice mode of operation. At step 1212, the label and location are then saved in a database. Subsequently, the labeled location is retrieved and used in manners disclosed here as well as in manners known or obvious to those skilled in the art. Furthermore, one of skill in the art understands that variations of the method shown in FIG. 12 are obvious without deviating from the invention.

In another embodiment, a properly equipped wireless device 202 delivers messages of a "community" of other users of a user's present location. In a particular application without limitation, a community of users is specified by the user to include for example his friends or colleagues. In another application, communities can be identified using other criteria as determined by the user, system administrator, or server. Furthermore, a user's present location is delivered to a community, so that a community can proceed to meet at a user's present location. One of skill in the art understands that other straightforward applications of the navigational system and method of this invention exist for utilizing the user's present location.

Figure 13:
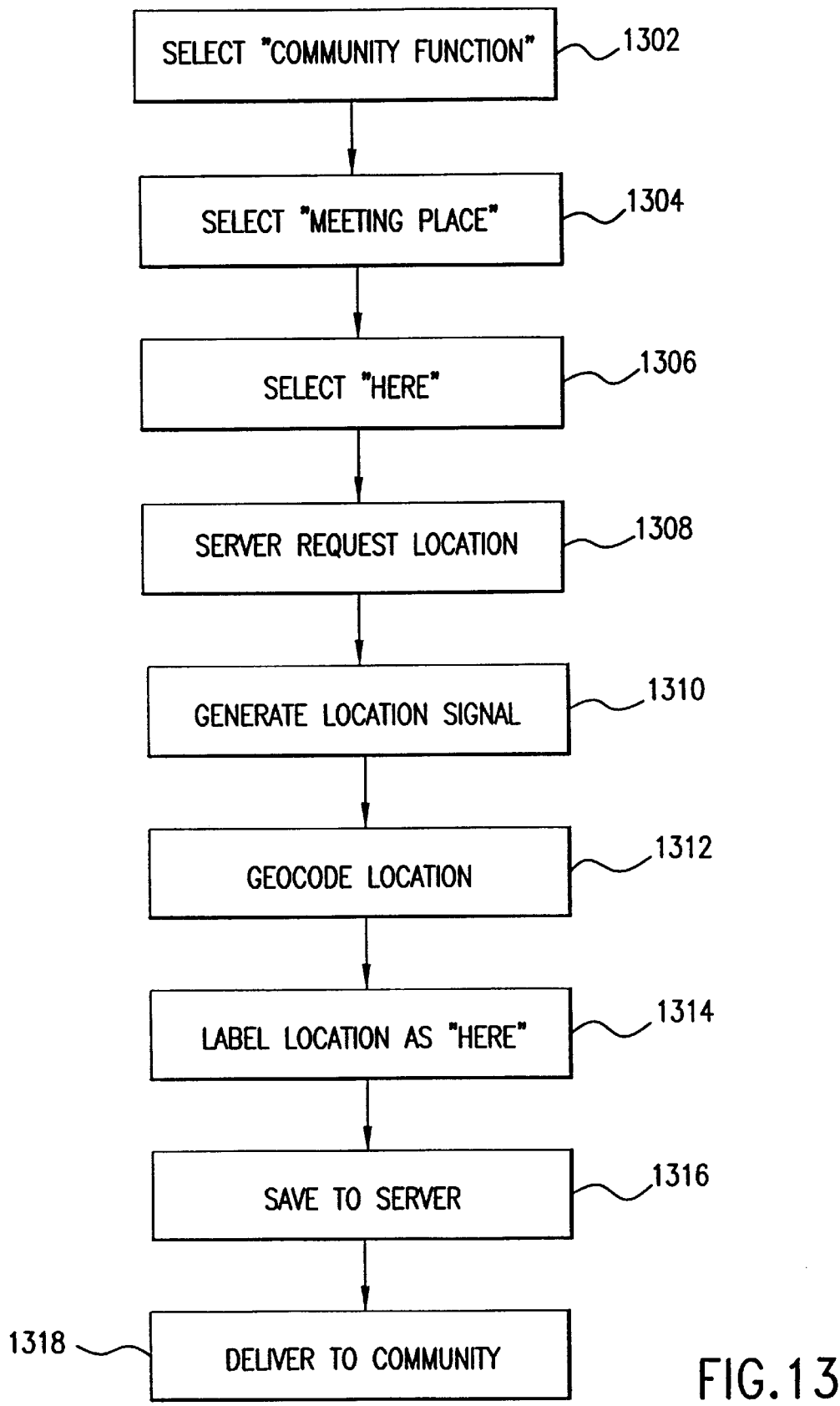
FIG. 13 is a flowchart of a method for sending "Here" as a meeting place for a community of users in an interactive real-time distributed navigation system in an embodiment of the invention.

For example, a method for delivering a user's current location as a meeting place is shown at FIG. 13. At step 1302, a user desiring to send his current location to a community selects a "Community Function." A user further desiring to send a meeting location to a community selects "Meeting Place" at step 1304. Subsequently, a user specifies that his present location is to be the meeting place by selecting "Here" at step 1306. Upon selecting such an option, the server then requests the user's location at step 1308. In an embodiment, such a request is routed through a location gateway that provides, among other services, geo-location of a user equipped with an appropriately equipped wireless device 202. The appropriately equipped wireless device 202 generates a location signal at step 1310, which is then received and geo-coded at step 1312. At step 1314, the user is then requested to label his current location. The user can provide appropriate input through a keypad on wireless device 202 or, where appropriately configured, through voice mode of operation. In one embodiment, the server provides a default label. At step 1316, the label and location are then saved to a database. Subsequently, the labeled location is delivered to the specified community at step 1318. The members of the specified community can then retrieve and use the delivered information in manners disclosed here, as well as in manners known or obvious to those skilled in the art. In a particular embodiment, each member of the community uses the delivered location as a destination input to the navigation system. One of skill in the art understands that variations of the method shown in FIG. 13 are obvious without deviating from the invention.

While the invention is described in conjunction with the preferred embodiments, it will be understood that they are not intended to limit the invention to these embodiments. The invention is intended to cover alternatives, modifications and equivalents, which may be included within the spirit and scope of the invention as defined by the appended claims.

APPENDIX A

POIMap.java

```
package phone.wml.poi;
import java.io.*;
import java.util.*;
import java.sql.*;
import javax.servlet.*;
import javax.servlet.http.*;
```

APPENDIX A-continued

POIMap.java

```java
import weblogic.html.*;
import weblogic.common.*;
import weblogic.db.jdbc.*;
import com.tn.util.*;
import com.tn.wmlKona.*;
import com.tn.map.proxy.*;
import com.tn.wdg.proxy.*;
public class POIMap extends HttpServlet
{
 Utl util = new Utl( );
 /*********************************************************
  * service
  *********************************************************/
    public void service( HttpServletRequest req, HttpServletResponse res )
            throws IOException
    {
            float fOrigLat = new Float( req.getParameter( "OLat" )).floatValue( );
            float fOrigLon = new Float( req.getParameter( "OLon" )).floatValue( );
            float fDestLat = new Float( req.getParameter( "DLat" )).floatValue( );
            float fDestLon = new Float( req.getParameter( "DLon" )).floatValue( );
            //util.log( "OrigLat = " + fOrigLat + ", origLon = " + fOrigLon + ", destLat =
" + fDestLat + ", fDestLon + "\n");
            try
            {
                MapProxy map = new MapProxy( );
                ProxyDirection dir = map.getDirection( fOrigLat, fOrigLon,
fDestLat, fDestLon );
     // hard-coded, need to talk to YC to add a few address to map server
                // ProxyDirection dir = map.getDirection( fOrigLat, fOrigLon,
37.418245, -122.135030 );
                res.setStatus( HttpServletResponse.SC_OK );
                res.setHeader( "Pragma", "no-cache" );
                res.setContentType( "text/vnd.wap.wml" );
            WmlDeck wd = null;
        if ( dir.getErrorCode( ) == dir.FOUND )
        {
                    String [ ] strMsg = dir.getDirectionMessage( );
                    for ( int i = 0; i < strMsg.length; i++ )
                {
                        WmlCard wc = new WmlCard( "dir" + i ).setTitle (
"POI-direction" );
                        WmlDoElement wmlAction = new WmlDoElement(
"ACCEPT" );
                        if (i != ( strMsg.length - 1 ) )
                        {
                        wmlAction.setTaskElement ( new WmlGoElement ( "#dir"
+ (i + 1 ) ) ).setLabel( "Next" );
                        }
                        else
                        {
                        wmlAction.setTaskElement (
            new WmlGoElement ( defaults.prefix( ) ) ).setLabel( "Home" );
                        }
                        wc.addDoElement( wmlAction );
                        wc.addParagraph ( new
WmlParagraph( ).setNowrapMode( ).addText ( strMsg[i] ) );
                        WmlDoElement wmlHome = new WmlDoElement(
"OPTIONS" );
                        //wmlHome.setTaskElement( new WmlPrevElement( )
).setLabel( "Back" );
                        wmlHome.setTaskElement(
            new WmlGoElement(
            defaults.prefix( ) + "RTNavStart.wml?StartId=-1" +
            "&OLat=" + fOrigLat +
        "&OLon=" + fOrigLon +
        "&DLat=" + fDestLat +
        "&DLon=" + fDestLon ) ).setLabel( "RtNav" );
                        wc.addDoElement( wmlHome );
                        if ( wd == null )
                        {
                            wd = new WmlDeck( wc );
                        }
        else
        {
            wd.addCard( wc );
        }
        }
```

APPENDIX A-continued

POIMap.java

```
                wd.print ( res.getOutputStream( ) );
        }
            else
            {
                util.log( "POIMap:: No driving direction found" );
                defaults.getFailureDeck( res );
            }
        }
        catch ( Exception e )
        {
                util.log( "POIMap exception" );
                defaults.getFailureDeck( res );
            }
    }
}
```

What is claimed is:

1. A method for determining a preferred path using non-deterministic input to a navigation system comprising the steps of:

maintaining a database of location information;

receiving non-deterministic input from a user;

identifying a first location for the user based on said database of location information, said non-deterministic input and one or more pre-determined criteria;

determining a preferred path from said first location to a second location, said step of determining based on said location information relating to said first location.

2. The method of claim 1, wherein the predetermined criteria comprises preplanned location information relating to the user.

3. The method of claim 1, wherein the predetermined criteria comprises specified delimiters which allow the recognition of location information embedded in the user's input.

4. The method of claim 3, wherein one said specified deliminter comprises a street name.

5. The method of claim 1, wherein the predetermined criteria comprise a previous location of the user.

6. The method of claim 1, wherein said second location is received from the user prior to receiving said non-deterministic input.

7. The method of claim 1, wherein said non-deterministic input is received audibly.

8. The method of claim 1, wherein said non-deterministic input is received textually.

9. The method of claim 1, wherein said non-deterministic input is received through an input device comprising a graphical display to the user.

10. The method of claim 1, wherein said non-deterministic input is received in an iterative manner as needed from the user.

11. A method for labeling a user's present location in a navigation system comprising the steps of:

requesting a first user location;

receiving a first a position signal from said user;

identifying said first user location based on said position signal;

receiving a first label from said user;

assigning said first label to the first user location;

storing the first label in a database of location information; and retrieving said first user location using said first label.

12. The method of claim 11 further comprising the steps of:

receiving a second position signal from a second user;

identifying a second user location based on said second position signal and one or more specified criteria; and generating at least one path between said first user location and said second user location.

13. The method of claim 12 further comprising the step of transmitting one said path to said first user.

14. The method of claim 1, wherein said step of receiving non-deterministic input comprises transmission of said input through a wireless device.

15. The method of claim 2, wherein said preplanned location information is received from the user through the Internet.

16. The method of claim 1, wherein said non-deterministic input is automatically provided by a wireless device employed by the user.

17. The method of claim 16, wherein said non-deterministic input comprises wireless subscriber information generated by said wireless device employed by the user.

18. The method of claim 1, wherein said non-deterministic input comprises a partial spelling of said first location.

19. The method of claim 1, wherein said non-deterministic input comprises no more than one touch-tone entry for each letter or digit of information.

20. A system for determining a preferred path using non-deterministic input to a navigational system, comprising:

an interface communicating with the user over a communications network, said interface configured to receive non-deterministic input from a user;

a storage device connected to the interface, said storage device containing location information, said location information comprising information about one or more locations;

a processor connected to the storage device;

said processor configured to identify a first location among said location information based on said non-deterministic input and one or more specified criteria; and said processor further configured to determine a preferred path from said first location to a second location.

21. A system for determining a preferred path using non-deterministic input, comprising:

interface means for receiving non-deterministic input from a user over a communications network;

storage means for storing location information, said location information comprising information about one or more locations, said storage means connected to said interface means;

means for identifying a first location among said location information based on said non-deterministic input and one or more specified criteria; and means or determining a preferred path from said first location to a second location.

22. A method for determining a preferred path using non-deterministic input to a navigation system, comprising the steps of:

maintaining a database of user information related to a user, said user information comprising historical route information for the user;

receiving query information from the user, said query information comprising non-deterministic input;

retrieving the user information for the user from the database;

sorting the user information based at least in part on the query information to produce navigational information; and conveying the navigational information to the user.

23. The method of claim 22, wherein the navigational information comprises a sorted route list.

24. The method of claim 22, wherein the historical route information is based at least in part on the frequency that the user has traveled a given route.

25. The method of claim 22, wherein the user information further comprises personal information for the user.

26. The method of claim 22, further comprising the step of obtaining said user information through the Internet.

27. The method of claim 22, wherein said query information is received through a wireless device.

28. The method of claim 27, wherein the user information further comprises identification information automatically generated by the user's wireless device.

29. A system for determining a preferred path using non-deterministic input to a navigational system, comprising:

a database of information including historical route information for a user;

a processor connected to the database, the processor configured to receive query information from the user and to generate navigational information based on the historical route information and the query information; said query information comprising non-deterministic input; and a transmission device connected to the processor, the transmission device configured to convey the navigational information to the user.

30. A method for determining a preferred path using non-deterministic input to a navigational system, comprising the steps of:

receiving non-deterministic input from the user;

identifying a preferred route based on the non-deterministic input and real-time traffic information.

31. The method of claim 20, wherein said query information is received through a wireless device.

32. The method of claim 31, wherein said real-time traffic information is obtained through the Internet.

33. The method of claim 30, wherein said real-time traffic information is obtained from information received from other users.

* * * * *

UNITED STATES PATENT AND TRADEMARK OFFICE
CERTIFICATE OF CORRECTION

| | | |
|---|---|---|
| PATENT NO. | : 6,405,123 B1 | Page 1 of 1 |
| APPLICATION NO. | : 09/574555 | |
| DATED | : June 11, 2002 | |
| INVENTOR(S) | : Rennard et al. | |

It is certified that error appears in the above-identified patent and that said Letters Patent is hereby corrected as shown below:

Column 14, line 27, delete "298SUNNYVALE" and insert therefor --298 SUNNYVALE--

Column 14, line 36, delete "Calif." and insert therefor --California--

Column 23, lines 21-22 (after "POIMao.java" title),
   delete the following:
      "//util.log( "OrigLat = " + fOrigLat + ", origLon = " + fOrigLon + ", destLat = " + fDestLat + ", fDestLon + "\n");"

and insert therefor the following:
      --//util.log( "OrigLat = " + fOrigLat + ", origLon = " + fOrigLon + ", destLat = " + fDestLat + ", destLon = " + fDestLon + "\n" );--

Column 25, claim 4, line 41, delete "deliminter" and insert therefor --delimiter--

Column 27, claim 21, line 8, delete "means or" and insert therefor --means for--

Column 28, claim 31, line 27, delete "claim 20" and insert therefor --claim 29--

Signed and Sealed this

Seventh Day of September, 2010

David J. Kappos
*Director of the United States Patent and Trademark Office*